United States Patent [19]

Ono et al.

[11] Patent Number: 5,444,574

[45] Date of Patent: Aug. 22, 1995

[54] ELECTRONIC IMAGE PICKUP APPARATUS EQUIPPED WITH MEANS FOR ELIMINATING MOIRÉ

[75] Inventors: Katsuya Ono; Akira Hasegawa, both of Tokyo, Japan

[73] Assignee: Olympus Optical Co., Ltd., Tokyo, Japan

[21] Appl. No.: 322,371

[22] Filed: Oct. 13, 1994

Related U.S. Application Data

[63] Continuation of Ser. No. 948,012, Sep. 18, 1992, abandoned.

[30] Foreign Application Priority Data

Sep. 19, 1991 [JP] Japan .................. 3-266979
Oct. 31, 1991 [JP] Japan .................. 3-311440

[51] Int. Cl.$^6$ .......................... G02B 3/02; G02B 3/00
[52] U.S. Cl. ........................ 359/708; 359/709; 359/722; 359/723; 359/738; 348/342
[58] Field of Search ............... 359/708, 709, 722–723, 359/710–718, 738–740, 885, 891; 358/213.11, 225, 55, 253, 454; 348/65, 68, 272–273, 335, 340, 360, 342

[56] References Cited

U.S. PATENT DOCUMENTS 4,472,735 9/1984 Shinozaki et al. .................. 358/47
4,720,637 1/1988 Clark ................................ 358/55
5,121,213 6/1992 Nishioka ....................... 358/213.11

FOREIGN PATENT DOCUMENTS 47-38001 12/1972 Japan .
63-6520 1/1988 Japan .
63-24523 2/1988 Japan .
1151880 6/1989 Japan .

*Primary Examiner*—Loha Ben
*Assistant Examiner*—James Phan
*Attorney, Agent, or Firm*—Cushman, Darby & Cushman

[57] ABSTRACT

An electronic image pickup apparatus comprising an imaging optical system for forming images of an object and image pickup device having light receiving surface configured so as to sample the images at discontinuously distributed points. This image pickup apparatus functions to sample the images of the object formed by the imaging optical system while receiving the images on the light receiving surface of the image pickup device and output signals representing light intensities on the object side. Disposed in the imaging optical system is a refracting surface which produces the optical low pass effect and has a shape capable of exhibiting an effect to eliminate moiré, for example, due to a fact that it includes a point on which differential coefficients of a function expressing a shape of the refracting surface are discontinuous.

4 Claims, 33 Drawing Sheets

LENS                                   IMAGE SURFACE

FIG. 13
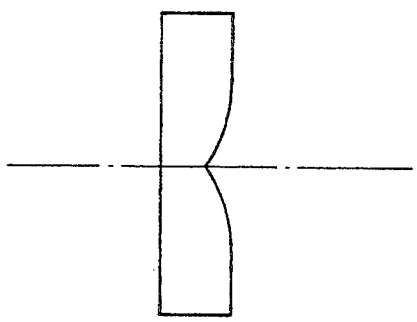
FIG. 14A         FIG. 14B
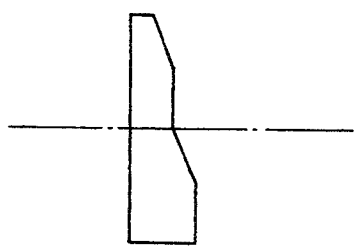   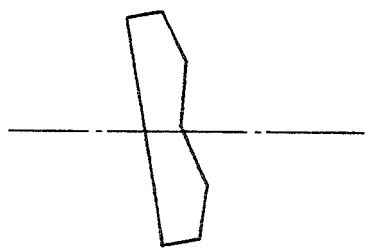

WIDE POSITION

TELE POSITION

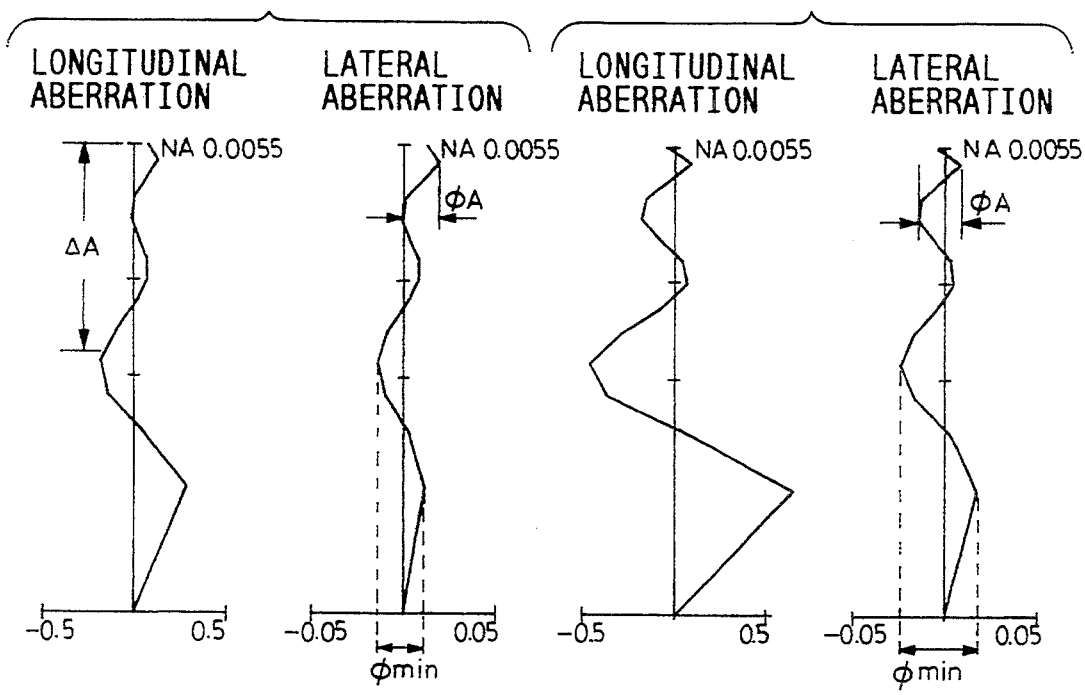
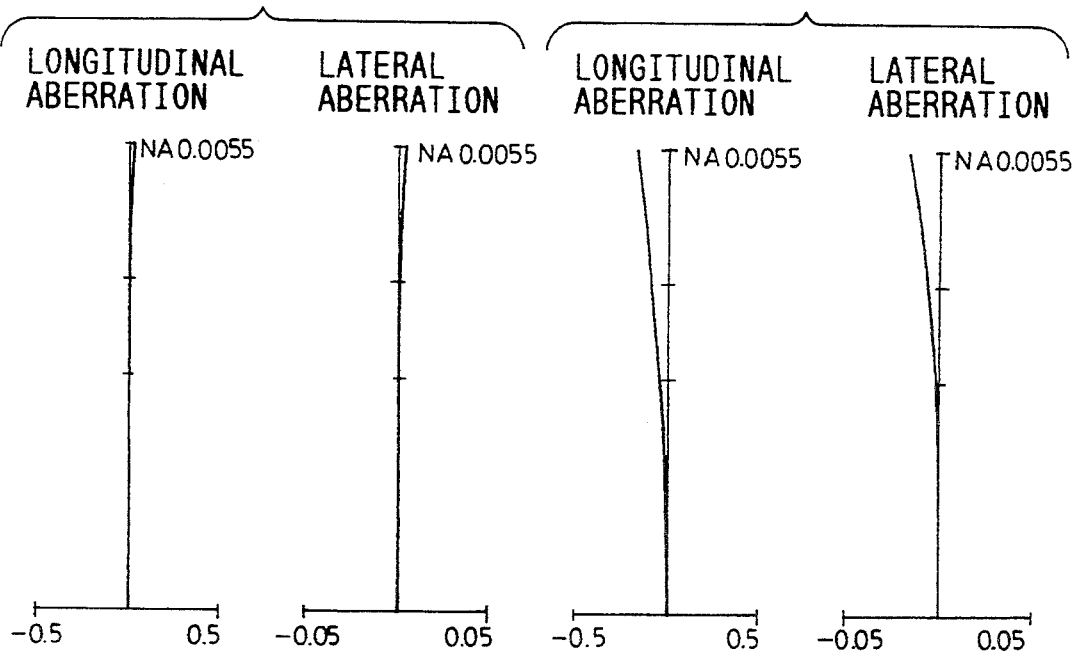

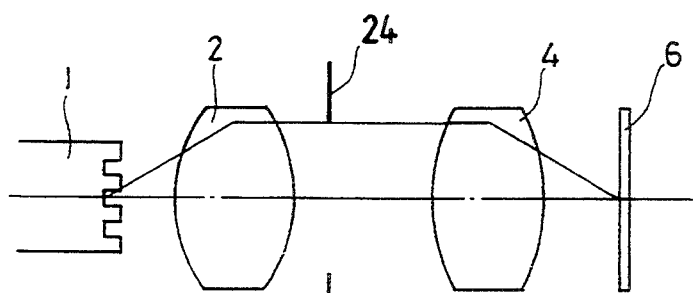
FIG. 44A
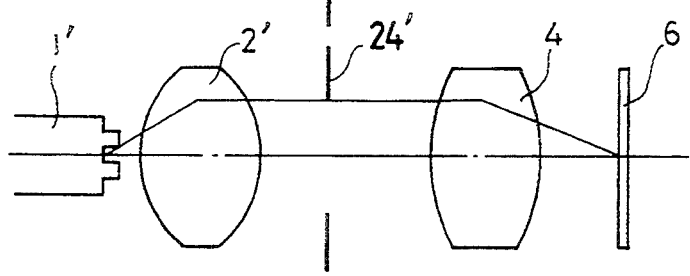
FIG. 44B
FIG. 45
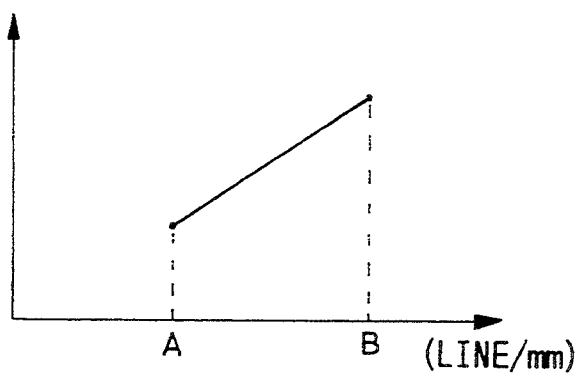
FIG. 46
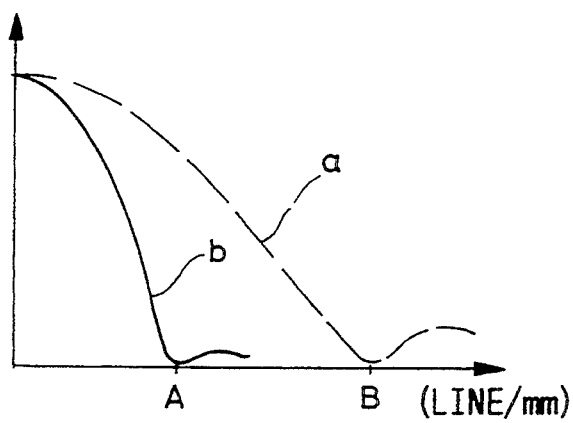

FIG. 47
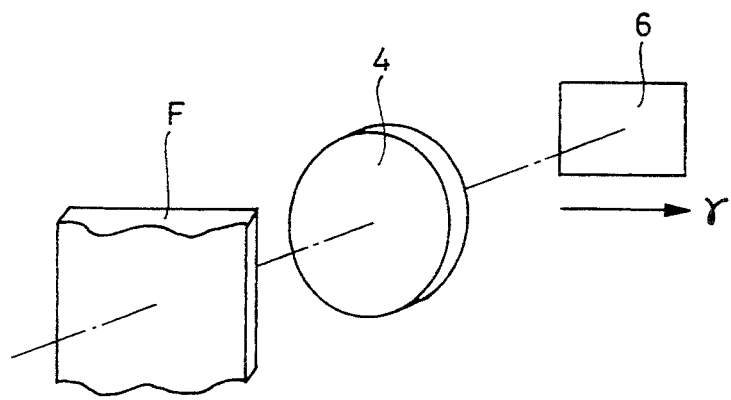
FIG. 48
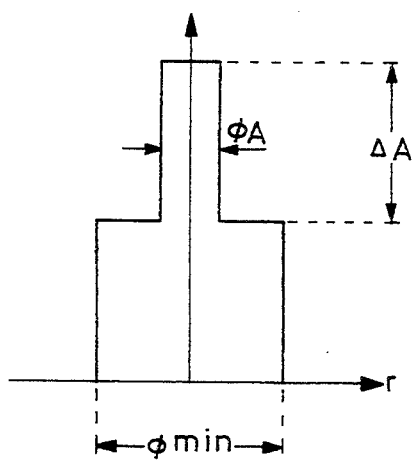
FIG. 49A       FIG. 49B       FIG. 49C
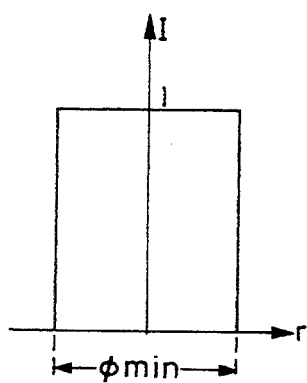   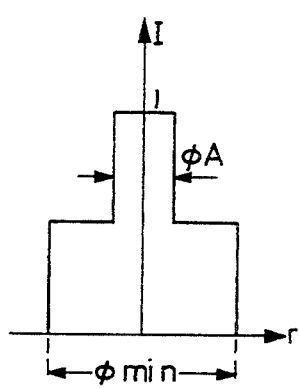   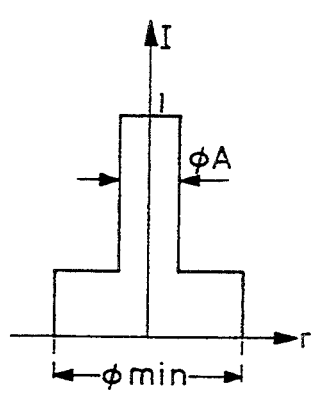

BEST IMAGE SURFACE      GAUSSIAN IMAGE SURFACE

ELECTRONIC IMAGE PICKUP APPARATUS EQUIPPED WITH MEANS FOR ELIMINATING MOIRÉ

This is a continuation of application Ser. No. 07/948,012, filed on Sep. 18, 1992, which was abandoned upon the filing hereof 08/322,371.

BACKGROUND OF THE INVENTION a) Field of the Invention

The present invention relates to an electronic image pickup apparatus comprising an optical system for forming images of an object on light receiving surfaces of image pickup devices which sample and pickup light intensities on the light receiving surface thereof.

b) Description of the Prior Art

An electronic image pickup apparatus, for example a television camera, comprises solid-state image pickup devices such as CCD image sensors and an imaging optical system which functions to form images of an object on light receiving surfaces of these image pickup devices. The image pickup devices of this type comprise a large number of picture elements which are disposed in lattice patterns and configured so as to spatially sample, at discontinuously distributed picture elements, the images of the object formed on the light receiving surfaces of the image pickup devices. These image pickup devices have a function to convert the sampled light intensities into electrical signals and output these signals. The images of the object are reproduced on a display unit such as a monitor television set on the basis of the electrical signals obtained with the image pickup devices.

When the images of the object contain components which have spatial frequencies exceeding a Nyquist frequency limit for the image pickup devices, the image pickup apparatus equipped with the image pickup devices for spatially sampling the images of the object allows spurious signals such as moiré or aliasing to be produced, thereby remarkably degrading quality of the images which are reproduced on the display unit. For this reason, an imaging optical system which is to be used in the image pickup apparatus of this type is configured so as to exhibit an effect to limit spatial frequency response so that components having frequencies in the vicinity of the Nyquist frequency limit are eliminated out of spatial frequency components contained in the images of the object (the effect to limit the spatial frequency response will hereinafter be referred to as an optical low pass effect). The optical low pass effect is obtained, for example, by forming dualized images with a quartz filter disposed in the imaging optical system or blurring the images of the object with a phase filter.

Further, other methods are known to obtain the optical low pass effect: Japanese Utility Model Kokai Publication No. Sho 63-24,523 discloses a method to form dualized images by disposing a wedge-shaped prism in the imaging optical system so that a portion of a light bundle passes through this prism; Japanese Patent Kokai Publication No. Sho 47-38,001 proposes a method to form ring-shaped blurred images with a conical prism disposed in the imaging optical system; and Japanese Patent Kokai Publication No. Sho 63-6,520 discloses a method to blur the images by producing spherical aberration of higher orders in the imaging optical system.

Out of the methods mentioned above, the one which is utilized most frequently at the current time is the method which uses the quartz filter disposed in the imaging optical system and exhibits favorable optical low pass effect.

However, the quartz filter exhibits the optical low pass effect only in a direction in which rays are separated from one another by the quartz filter. That is to say, the optical low pass effect produced by the quartz filter is one dimensional. In order to obtain the optical low pass effect in two dimensions (for example, in the horizontal scanning direction and the vertical scanning direction on the image pickup devices) with the quartz filter, it is necessary to use a plurality of quartz filters at the same time. Consequently, the imaging optical system must comprise a large space for disposing the plurality of quartz filters and requires a higher manufacturing cost.

Furthermore, another method is available to obtain the optical low pass effect by disposing a phase filter in the imaging optical system. This method does not require a high cost for obtaining the optical low pass effect, but produces an adverse influence on resolution of the imaging optical system which is larger than that produced by the method utilizing the quartz filter.

Moreover, the method which utilizes the spherical aberration of higher orders for obtaining the optical low pass effect permits manufacturing the imaging optical system at a relatively low cost and obtaining the optical low pass effect in the two dimensions. However, rays which pass in the vicinities of an optical axis are scarcely influenced by the spherical aberration of higher orders. Accordingly, the method utilizing the spherical aberration of higher orders cannot eliminate completely the high-frequency components and can hardly exhibit the optical low pass effect which is as favorable as that obtainable by the method using the quartz filters.

In addition, the method which utilizes the conical prism can exhibit the two-dimensional optical low pass effect and does not require reserving a space, in the imaging optical system, which is not so large as that required for the wedge-shaped prism or that for the quartz filters. Further, since the conical prism can separate also the rays passing in the vicinities of the optical axis, this method is free from the insufficient elimination of the high-frequency components which is allowed by the method utilizing the spherical aberration of high orders. However, the method utilizing the conical prism allows a diameter of a minimum circle of confusion to remain substantially unchanged by defocusing, thereby allowing light intensity to be enhanced at a center of light intensity distribution of point images. Consequently, this method allows MTF (Modulation Transfer Function) of the imaging optical system to be enhanced and cannot provide a favorable optical low pass effect. Furthermore, this method allows aberrations produced in the optical system to hinder favorable resolution of the point images.

SUMMARY OF THE INVENTION

A primary object of the present invention is to provide an electronic image pickup apparatus which comprises image pickup devices configured so as to sample light intensities on images of an object at discontinuously distributed points, an imaging optical system for forming the images of the object on light receiving surfaces of the image pickup devices and a refracting surface which is disposed in, before or after the imaging optical system so as to produce the optical low pass effect.

Another object of the present invention is to provide an electronic image pickup apparatus which comprises image pickup devices configured so as to sample light intensities on images of an object at discontinuously distributed points, an imaging optical system for forming the images of the object on light receiving surfaces of the image pickup devices, an aperture stop which is disposed in the imaging optical system for determining an F number of this optical system, and a means which is disposed in the vicinity of the aperture stop and functions to lower a spatial frequency response of the imaging optical system by producing aberrations of high orders in amounts which are different dependently on directions on an image surface of the imaging optical system (hereinafter referred to as aberrations having directivities).

BRIEF DESCRIPTION OF THE DRAWINGS

FIG. 13 shows a sectional view illustrating another optical low pars filter of the first type which is to be used in the electronic image pickup apparatus according to the present invention;

FIG. 14A and FIG. 14B show sectional views illustrating still other optical low pass filters of the first type;

FIG. 42A and FIG. 42B show graphs illustrating lateral aberrations in the horizontal direction at a wide position and a tele position respectively of the sixth embodiment of the image pickup apparatus according to the present invention;

FIG. 43A and FIG. 43B show graphs illustrating lateral aberrations in the vertical direction at the wide position and the tele position respectively of the sixth embodiment of the image pickup apparatus according to the present invention;

FIG. 44A and FIG. 44B show sectional views illustrating compositions of the conventional imaging optical systems which are connected to fiberscopes having different diameters;

FIG. 45 shows a diagram illustrating relationship between diameters of aperture stops used in optical systems of endoscopes and spatial frequencies;

FIG. 46 shows a graph illustrating an MTF of an optical system for endoscopes;

FIG. 47 shows a perspective view of an optical means (an optical low pass filter of the third type) which is to be used in the third type of the image pickup apparatus according to the present invention;

FIG. 48 shows a diagram illustrating the relationship between apertures of optical systems and aberrations;

FIG. 49A, FIG. 49B and FIG. 49C show diagrams illustrating the relationship shown in FIG. 48 for the respective apertures;

DETAILED DESCRIPTION OF THE PREFERRED EMBODIMENTS

The first type of the image pickup apparatus according to the present invention comprises an imaging optical system for forming images of an object and image pickup devices which have light receiving surfaces configured so as to sample the images at discontinuously distributed points. This image pickup apparatus has a function to output signals representing a light intensity distribution on the images of the object while receiving and sampling the images of the object formed by the imaging optical system with the light receiving surfaces. The image pickup apparatus of the first type comprises a refracting surface having the optical low pass effect in the imaging optical system and has, within an effective diameter of a light bundle passing through the refracting surface, a point at which differential coefficients of a function representing a shape of the refracting surface are discontinuous.

In a preferred formation aspect of the first type of the image pickup apparatus according to the present invention, the shape of the refracting surface is expressed by a formula shown below, and satisfies the following conditions (A) and (B):

$$z = C_0 + C_1 r + C_2 r^2 + C_3 r^3 + \ldots + C_n r^n \quad (i)$$

wherein the reference symbol z represents a direction of an optical axis of the imaging optical system and the reference symbol r designates a direction perpendicular to the optical axis.

(A) In the formula (i) mentioned above, the coefficient $C_1$ of the term of the first order has a value which is not zero.

(B) In the formula (i) mentioned above, at least one of the coefficients $C_2, C_3, \ldots C_n$ of the terms of the second and higher orders has a value which is not zero.

Further, in another formation aspect of the first type of the image pickup apparatus according to the present invention, the refracting surface includes portions expressed by the above-mentioned formula (i), and satisfies the following conditions (C) and (D):

(C) The refracting surface consists of a plurarity of the portions which are expressed by the formula (i).

(D) For each of the portions of the refracting surface expressed by the formula (i), the coefficient $C_1$ of the term of the first order has a value which is not zero in the formula (i).

Figure 64:
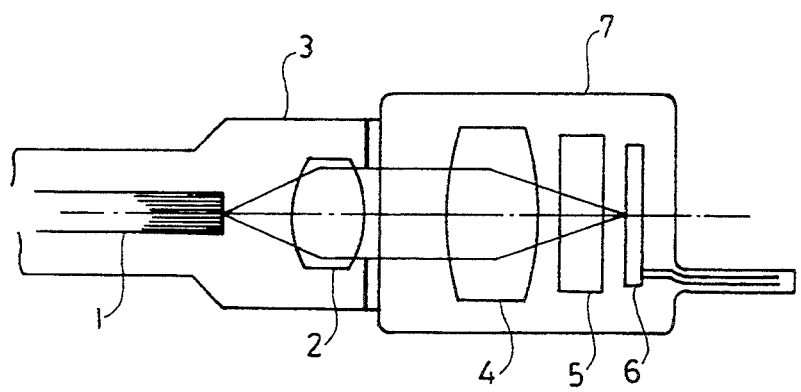
FIG. 64 shows a sectional view illustrating a composition of an endoscope.

Now, description will be made of embodiments of the first type of the image pickup apparatus according to the present invention with reference to the accompanying drawings. The embodiments which are to be described below are television cameras which are to be attached to eyepiece lenses of endoscopes in practical use. One of these embodiment is, for example, a television camera which is to be used in a state illustrated in FIG. 64. In FIG. 64, the reference numeral 3 represents a fiberscope which comprises an image guide fiber bundle 1 and an eyepiece lens 2. A television camera 7 which is to be attached to a rear side of the eyepiece lens 2 comprises an imaging optical system 4, a filter 5 and a solid-state image pickup device 6. In addition, a distal end of the endoscope is not shown in FIG. 64.

Figure 1:
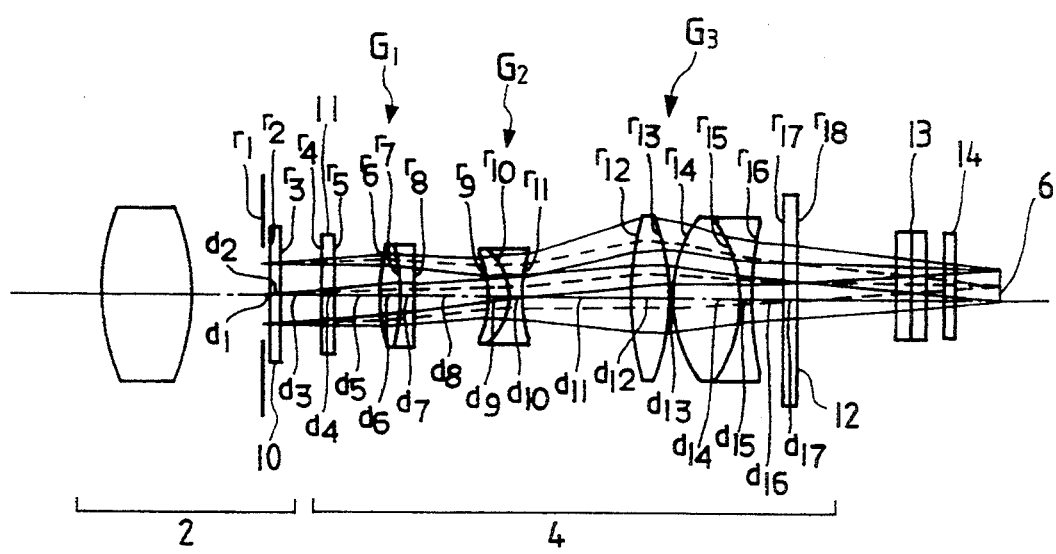
FIG. 1 shows a sectional view illustrating a composition of a first embodiment of the electronic image pickup apparatus according to the present invention.

In FIG. 1 which illustrates details of a composition within a range from the imaging optical system to the solid-state image pickup device, the reference numeral 2 represents, for example, the eyepiece lens shown in FIG. 64, and the imaging optical system 4 is designed as a zoom lens system consisting of three lens units of $G_1$, $G_2$ and $G_3$. In FIG. 1, the reference numeral 10 represents a cover glass plate used for covering the eyepiece lens 2 of the endoscope, the reference numeral 11 and 12 designate other cover glass plates which are used for covering the front and rear surfaces of the imaging optical system 4, the reference numeral 13 denotes a quartz filter and the reference numeral 14 represents an infrared light cut-off filter. Further, the reference numeral 6 represents the abovementioned solid-state image pickup device having a light receiving surface onto which an image of an object appearing on an end surface of emergence of an image guide fiber bundle (not shown) is reimaged by the eyepiece lens 2 and the imaging optical system 4.

In each of these embodiments, disposed on one surface of the cover glass plate is a refracting surface having the optical low pass filter effect.

Figure 3:
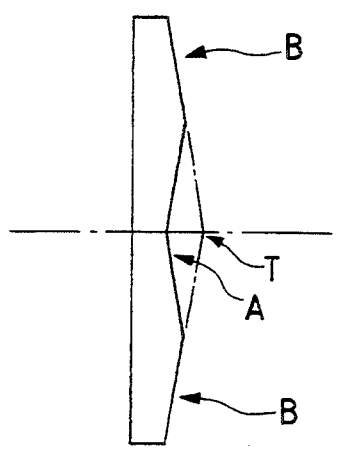
FIG. 3 shows a sectional view illustrating an optical low pass filter of a first type which is to be used in the electronic image pickup apparatus according to the present invention.
Figure 4:
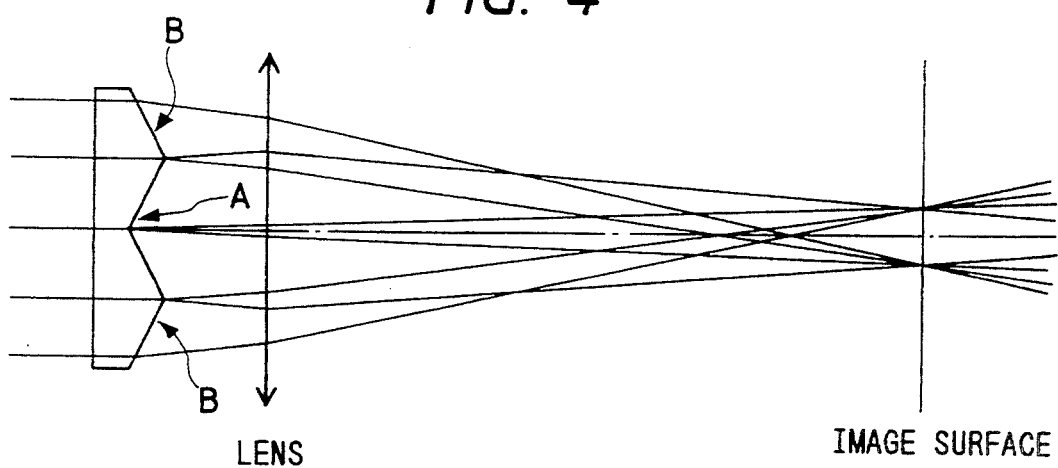
FIG. 4 shows a sectional view illustrating a condition of a light bundle which is imaged by an imaging optical system comprising the optical low pass filter of the first type.

FIG. 3 illustrates the cover glass plate 11 on an enlarged scale, with a shape of the refracting surface emphasized. Though the cover glass plate 11 is illustrated in a sectional shape thereof in FIG. 3, the refracting surface of the cover glass plate 11 actually has a shape which is obtained by turning the sectional shape around an optical axis. This refracting surface has an inner region A which is in a shape of a portion of a conical surface and an outer region B which is in a shape of a portion of another conical surface set in the direction reverse to that of the inner region A. In other words, the outer region B of the refracting surface is obtained by removing a portion enclosed by the solid lines and the chain lines from a large cone which includes this portion and has a vertex T on the optical axis. Due to a fact that the refracting surface of the cover glass plate 11 shown in FIG. 3 has the shape described above, differential coefficients of a function expressing the shape of the refracting surface are discontinuous on the optical axis as well as on a boundary between the inner region A and the outer region B. The refracting surface having a point or a line on which the differential coefficients are discontinuous will hereinafter be referred to as a refracting surface having the first type of optical low pass effect or simply as a first type of refracting surface. Further, an optical member which has the first type of refracting surface will hereinafter be referred to as a first type of optical low pass filter.

Figure 15:
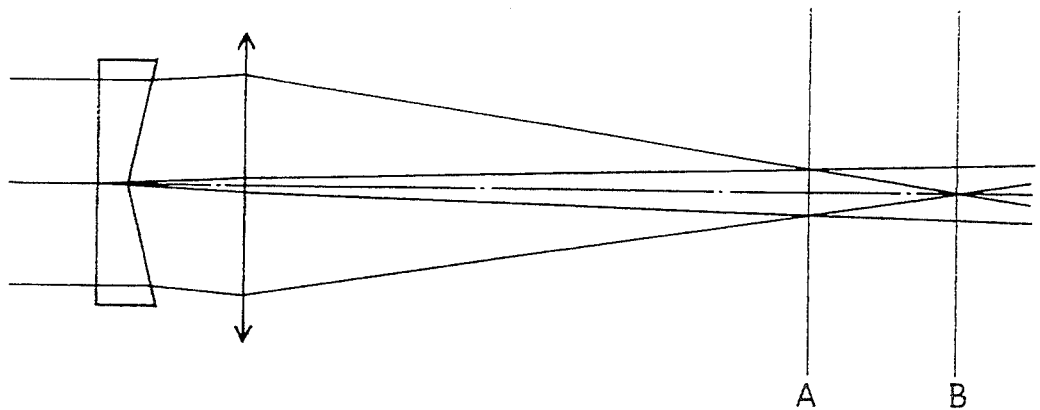
FIG. 15 shows a diagram illustrating a condition of a light bundle which is imaged by an optical system comprising the conventional wedge-shaped prism.
Figure 16A:
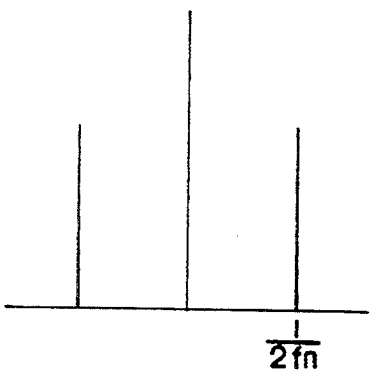
FIG. 16A and FIG. 16B show graphs illustrating spatial frequency characteristics of optical systems comprising the wedge-shaped prisms.
Figure 16B:
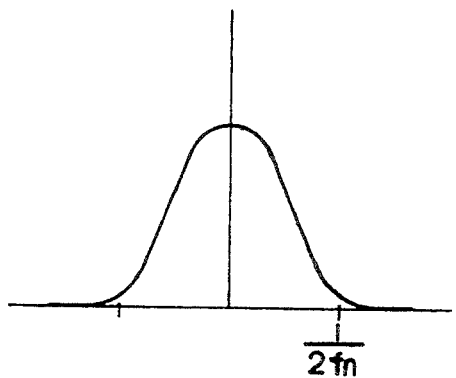

When the prism used in the optical system disclosed by Japanese Patent Kokai Publication No. Sho 47-38,001 is disposed in an optical system as illustrated in FIG. 15, an MTF of a ring-shaped image is enhanced as shown in FIG. 16A and FIG. 16B since light intensities on the ring-shaped image are enhanced by defocusing the ring-shaped image with a diameter thereof kept substantially unchanged. Further, since the optical systems is generally focused so as to obtain possible highest resolution, image signals are produced without setting an optimum cut-off frequency.

In the electronic image pickup apparatus according to the present invention, in contrast, light beams coming from a portion of the outer region B of the refracting surface which is located above the optical axis and a portion of the inner region A which is located below the optical axis are concentrated onto a point on an image surface which is located below the optical axis, whereas light beams coming from a portion of the outer region B of the refracting surface which is located below the optical axis and a portion of the inner region A which is located above the optical axis are concentrated onto a point on the image surface which is located above the optical axis. Since the light beams are concentrated at a large vergence angle onto the points located above and below the optical axis as described above, the light beams to form the ring-shaped image are largely apart from one another at locations deviated from the image surface, whereby sharpness of the image cannot be enhanced at the locations deviated from the image surface and a desired optical low pass effect can be obtained.

The first type of the refracting surface which is to be used in the first type of the image pickup apparatus according to the present invention is generally expressed by a combination of a plurality of formulae of aspherical surfaces each of which has a form of a polynominal. Further, the shape of the refracting surface can be expressed by a formula of aspherical surfaces which includes terms of odd orders as represented by the above-mentioned formula (i).

The condition that $C_1$ has a value which is not zero in the above-mentioned formula (i) is required for the fact that the surfaces of the refracting surface is not smoothly continuous on the optical axis, i.e., for the fact that the surface contains a point or a line on which the differential coefficients of the surface are discontinuous. Further, when all of the $C_n$'s ($n \geq 2$) are zero in the formula (i), this formula expresses a straight line. So far as at least one of the $C_n$'s is not zero, however, the formula (i) generally represents a curve, thereby enhancing freedom of designing a refracting surface so as to obtain images separated optimum from one another. Therefore, it is easy to design a refracting surface so that an image to be formed on the light receiving surface of the image pickup device has an MTF which has a cut-off frequency in the vicinity of a Nyquist frequency limit of the image pickup device. In a case where an image including regularly fixed pattern like that of the optical fibers arranged on an end surface of an image guide fiber bundle is to be formed on the solid-state image pickup device, it is sufficient to adopt a refracting surface which has an MTF having a cut-off frequency in the vicinity of a frequency of the fixed pattern contained in the image (hereinafter referred to as a sampling frequency of the image guide) or the Nyquist frequency limit the image pickup device.

Since a light bundle which is split by the first type of the refracting surface described above forms multiple images (or ring-shaped image) on the light receiving surface of the image pickup device, the optical low pass effect is useful for preventing spurious signals from being produced. A condition required for forming the ring-shaped image in a shape which makes a cut-off frequency of an MTF of the imaging optical system with a Nyquist frequency limit is shown below:

$$a \approx 0.77p$$

wherein the reference symbol a represents a radius of the ring-shaped image and the reference symbol p designates a sampling pitch of the image pickup devices.

Figure 5A:
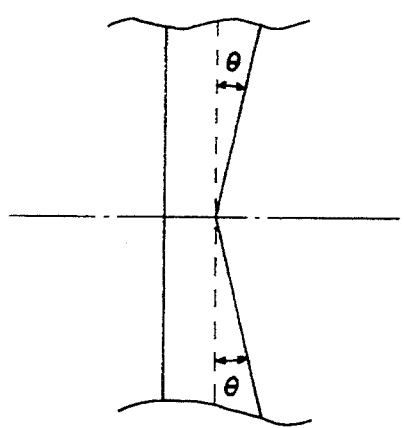
FIG. 5A and FIG. 5B show sectional views illustrating inclination angles of refracting surfaces as measured in the vicinities of points on the optical low pass filter of the first type on which differential coefficients are discontinuous.
Figure 5B:
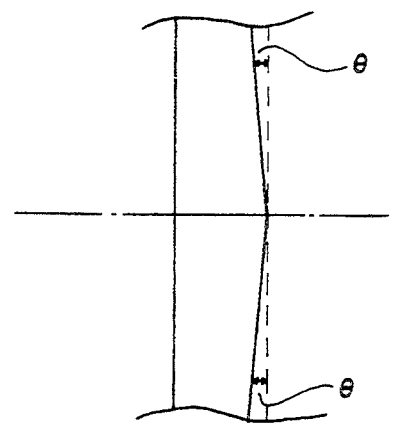

Though the refracting surface has a shape which is conceve at the center thereof (in the vicinity of the optical axis) in the case exemplified above, a phenomenon similar to that described above is produced in another case wherein the concavity and the convexity of the refracting surface are replaced with each other, i.e. when the refracting surface is convex at the center thereof. In either of these cases, an inclination angle of the refracting surface relative to a plane perpendicular to the optical axis in the vicinity of the optical axis (the angle $\theta$ shown in FIG. 5A or FIG. 5B) is expressed by the following formula:

$$|\theta| = a/\{f_2 \cdot (n-1)\} = \{2 \cdot f_n \cdot f_2 \cdot (n-1)\}^{-1}$$

wherein the reference symbol n represents a refracting index of a medium of the optical low pass filter, the reference symbol $\theta$ the inclination angle of the refracting surface, measured in the vicinity of the optical axis as shown in FIG. 5A or FIG. 5B, which is ordinarily very small and nearly equal to $\sin \theta$, the reference symbol $f_n$ denotes Nyquist frequency ($f_n = \frac{1}{2}p$) of the image pickup device or a spatial frequency to cut off the MTF, and the reference symbol $f_2$ represents a focal length of an optical system disposed between the refracting surface and the image pickup device.

It is desirable that the inclination angle $\theta$ satisfies the following condition (ii):

$$\{0.2 \cdot f_n \cdot (n-1)\}^{-1} \geq |\theta| \geq \{10 \cdot f_n \cdot f_2 (n-1)\}^{-1} \quad \text{(ii)}$$

In a case where a refracting surface having the optical low pass effect described above is disposed so as to be in contact with air, the inclination angle $\theta$ ordinarily has a very small value. When the optical system has a small pupil, the convexity or the concavity of the refracting surface has a very small height or a very small depth, thereby making it very difficult to manufacture the refracting surface with high precision. In this case, it is proper to configure the refracting surface as surface cemented to an optical element (lens, filter or the similar element). When refractive indices of media disposed before and after the refracting surface which is configured as the cemented surface are represented by n and $n_b$ respectively, $(n-1)$ used in the above-mentioned condition (ii) is expressed as $(n-n_b)$, thereby enlarging the value of $\theta$ in this case. As a result, it is possible to increase the height of the convexity or the depth of the concavity on the refracting surface.

Further, the following relationship establishes between the inclination angle $\theta$ and $C_1$ used in the formula (i):

$$C_1 \approx \tan \theta = \theta$$

Furthermore, it is possible to obtain the optical low pass effect favorably over the entire range of an image pickup surface by disposing the above-mentioned first type of refractive surface in the vicinity of a pupil of the imaging optical system. The first type of refractive surface or the first type of optical low pass filter may be more or less eccentric with regard to the optical axis. So far as the refractive surface or the optical low pass filter is disposed in the vicinity of the pupil, the eccentric disposition of the refracting surface or the optical low pass filter does not produce so large an influence on separation of spot images and is effective for preventing ghost.

The first type of refractive surface which has a rotationally symmetrical shape makes it possible to control an MTF in two dimensions and reduce a number of optical low pass filters to be used in the image pickup apparatus.

Figure 6A:
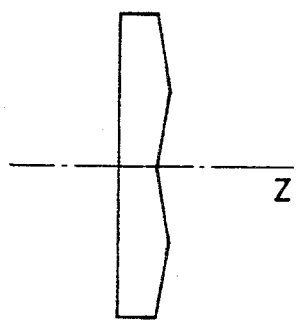
FIG. 6A and FIG. 6B show sectional views illustrating shapes of surfaces of different optical low pass filters of the first type.
Figure 6B:
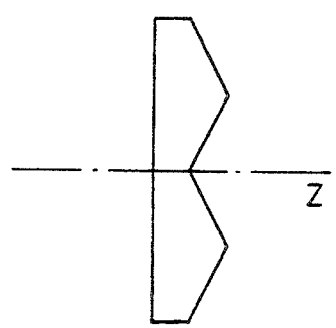

Further, when image pickup devices which have Nyquist frequency limits different between the horizontal direction and the vertical direction are used, it is possible to obtain the cut-off function effectively in the vicinities of the Nyquist frequency limits in the horizontal direction and the vertical direction respectively by using a single optical low pass filter which is anamorphic as shown in FIG. 6A or FIG. 6B. In addition, the direction of the optical axis is taken as the z axis in FIG. 6A and FIG. 6B. FIG. 6A shows a y-z section (vertical section) of the optical low pass filter, whereas FIG. 6B shows an x-z section (horizontal section). The anamorphic surface is expressed by the following formula:

$$z = A_0 + A_1 x + B_1 y + A_2 x^2 + B_2 y^2 + A_3 x^3 + B_3 y^3 + \ldots A_n x^n + B_n y^n \quad (A_1 \neq 0 \text{ or } B_1 \neq 0)$$

wherein the reference symbols x and y represent coordinates axes which intersect perpendicularly on a plane perpendicular to the optical axis, and the reference symbols A, B, . . . designate coefficients of the terms.

In case of a system in which a television camera is attached to fiberscopes for observing images on a TV monitor, image guide fiber bundles are generally different dependently on individual fiberscopes, whereby frequencies are different on images of end surfaces of the image guide fiber bundles which are formed on the image pickup devices of the TV camera. It is therefore difficult to eliminate spurious signals for all the fiberscopes to be used with the image pickup apparatus according to the present invention.

In the above-mentioned system in which a television camera is to be attached to fiberscopes, it is desirable to select optical low pass filters which are optimum for individual combinations of fiberscopes and the TV camera. For this selection, it is sufficient, for example, to adopt replaceable adaptors which permit connecting the fiberscopes to the television camera and dispose, in the adaptors, optical low pass filters which are matched with frequencies of image guide fiber bundles. Alternately, it is sufficient for the selection to dispose optical low pass filters, in fiberscopes, which are suited for use with the fiberscopes respectively.

Further, in a case where a non-flexible endoscope equipped with a relay lens system and a fiberscope can be combined selectively with a television camera in a single system, image quality is unwantedly lowered when an optical low pass filter for the fiberscope is used in the system wherein the non-flexible endoscope is combined with the television camera. Inversely, spurious signals are produced by using an optical low pass filter in the system wherein the fiberscope is combined with the television camera.

When the image pickup apparatus according to the present invention is to be used in the system which permits combining a non-flexible endoscope and the fiberscope selectively as described above, it is therefore possible to use an endoscope or a fiberscope optionally in a single system for observing images with optimum quality by preparing two types of optical low pass filters and exchanging the optical low pass filters with each other in conjunction with exchange between the non-flexible endoscope and the fiberscope or exchanging two types of adaptors comprising optical low pass filters different from each other. Moreover, it is possible to obtain an optimum system which can be manufactured at a low cost by configuring the image pickup apparatus according to the present invention so that it permits disposing an optical low pass filter in the adaptor or the television camera and exchanging the optical low pass filter with another.

The image pickup apparatus according to the present invention permits using a plurality of optical low pass filters at the same time and in combination with different types of low pass filters such as quartz filters.

In different types of image pickup apparatuses, for example, those in which images sampled by image guide fiber bundles having different diameters are imaged by lens system onto image pickup devices, sampling frequencies are different dependently on the diameters of the image guide fiber bundles and the different types of image pickup apparatuses require different types of optical low pass filters. In case of a CCD which is equipped with a color encoding filter array such as color mosaic filter, for example, frequencies producing spurious signals have directivities. It is therefore possible to eliminate the spurious signals by lowering the MTF with a quartz filter in the vicinity of the color sampling frequency in the horizontal direction at which strong spurious signals are produced. Since optical fibers are arranged densely in six directions in an image guide fiber bundle have frequencies distributed at intervals of 60° and in one phase when traced in curves, it is possible to eliminate the moiré effectively by lowering the MTF by the optical low pass filter used in the image pickup apparatus according to the present invention. Relationship of a distance o between optical fibers arranged in the image guide fiber bundle versus $C_1$ used in the formula (i) is expressed as follows;

$$0.5 \times o \times \sin(\pi/3) \times \beta = C_1 \times f_2 \times (n-1) \times 2$$

wherein the reference symbol $\beta$ represents an imaging magnification on the image pickup device. Further, $(n-1)$ can be replaced with $(n-n_6)$ in the formula mentioned above when the optical low pass filter used in the image pickup apparatus according to the present invention is designed as a cemented surface.

Since the optical low pass filter mentioned above exhibits an optical low pass effect which is affected by aberrations produced in the imaging optical system, $C_1$ need not have a value which strictly satisfies the formula mentioned above and is sufficient so far as it satisfies the following condition;

$$5 \times o \times \sin(\pi/3) \times \beta \geq C_1 \times f_2 \times (n-1) \times 2 \geq 0.1 \times o \times \sin(\pi/3) \times \beta$$

Moreover, it is desirable for lowering manufacturing cost of the image pickup apparatus according to the present invention that the optical low pass filter (the refracting surface) used in the image pickup apparatus according to the present invention is designed as a lens surface which is integrated with a lens element.

In addition, it is possible, in the first embodiment of the present invention illustrated in FIG. 1, to configure the imaging lens system 4 so as to be separable from the section disposed thereafter and design the imaging lens system so as to have an additional role of an adaptor for connecting an eyepiece lens of an endoscope to a camera head comprising solid-state image pickup devices.

Figure 7:
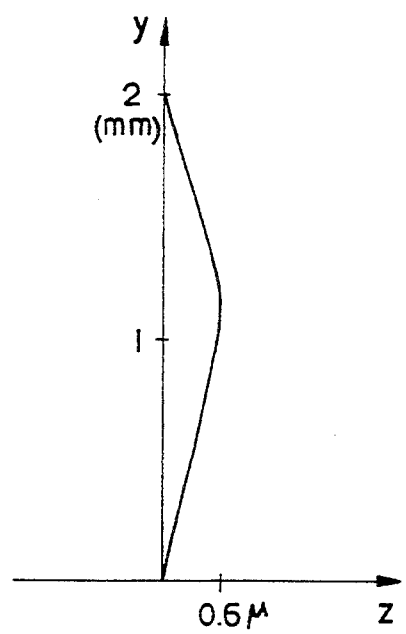
FIG. 7 shows a sectional view illustrating an optical low pass filter of the first type which is to be used in embodiments of the electronic image pickup apparatus according to the present invention.
Figure 8:
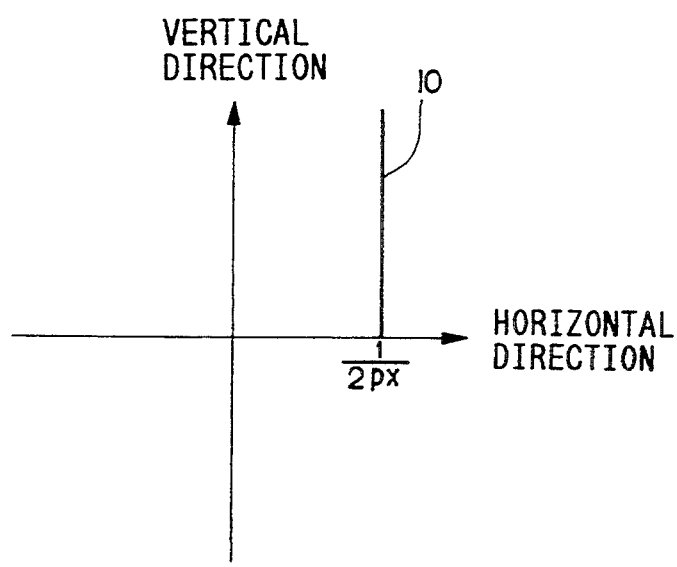
FIG. 8 shows a diagram illustrating a trap line of a quartz filter.
Figure 10:
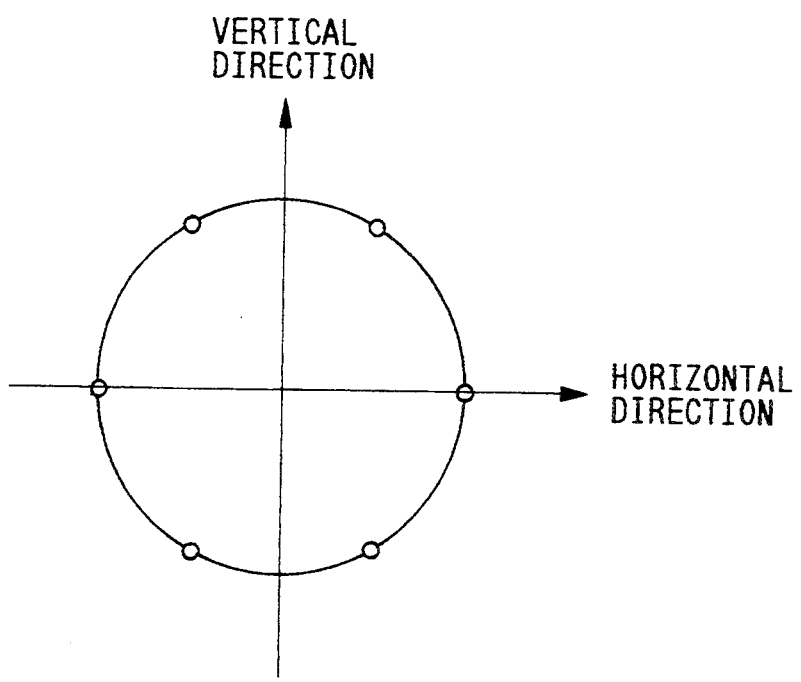
FIG. 10 shows a diagram illustrating a trap line of the optical low pass filter of the first type which is to be used in the electronic image pickup apparatus according to the present invention.

FIG. 7 shows a concrete shape of the refracting surface disposed on the cover glass plate 11, in a form of sectional view only of a portion which is located above the optical axis. This refracting surface has protrusion which is about 0.6 μm high and has a convexity formed to a point 2 mm above the optical axis as well as a top smoothly curved. This filter produces a circular trap line passing through the sampling frequency of the image guide fiber bundle as shown in FIG. 10.

Figure 9:
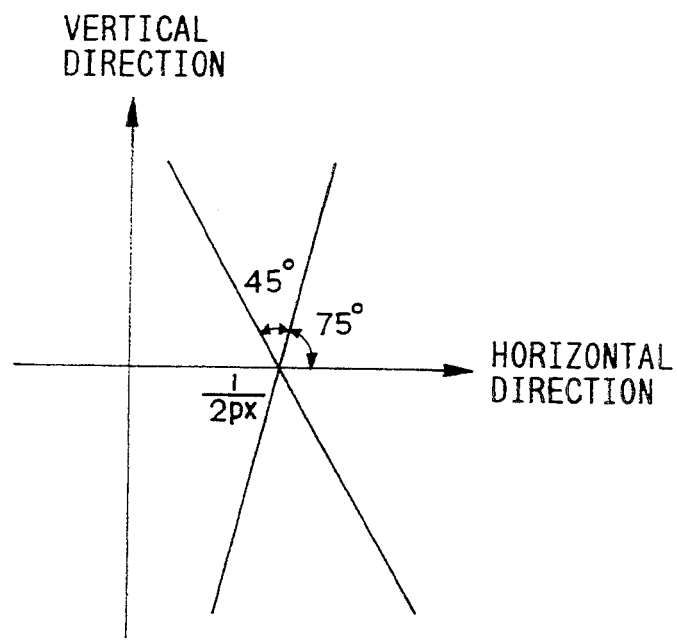
FIG. 9 shows a diagram illustrating trap lines of quartz filters.

Further, in the first embodiment of the image pickup apparatus according to the present invention, the refracting surface described above is combined with a quartz filter which comprises two quartz plates and produces such trap lines as shown in FIG. 9. In FIG. 9, the reference symbol $P_x$ represents a pitch of picture elements arranged in the horizontal direction in the solid-state image pickup devices.

Even when the image pickup apparatus according to the present invention is to be combined with endoscopes equipped with image guide fiber bundles having sampling frequencies different from one another, it is possible to obtain favorable image signals by preparing different types of adapters which have the composition described above and are equipped with optical low pass filters having cutoff frequencies different from one another, and selecting an adaptor which comprises an optical low pass filter optimum for a sampling frequency of the image guide fiber bundle of the endoscope combined with the adaptor.

Further, when the adaptor is configured so as to permit exchanging only the optical low pass filters to be used in the image pickup apparatus according to the present invention and a plurality of optical low pass filters having different cut-off frequencies are prepared, it is possible to obtain favorable image signals with a single adaptor by selecting an optical low pass filter which is optimum for each endoscope.

Since the imaging optical system can be zoomed, a frequency for sampling images of an end surface of an image guide fiber bundle on the light receiving surface is changed by zooming. In this case, it is possible to always obtain favorable image signals regardless of change of a magnification of the imaging optical system by disposing the optical low pass filter before the varifocal optical system so that the frequency on the light receiving surface for sampling the images of end surface of the image guide fiber bundle is always coincident with a trap line of the optical low pass filter.

Figure 11:
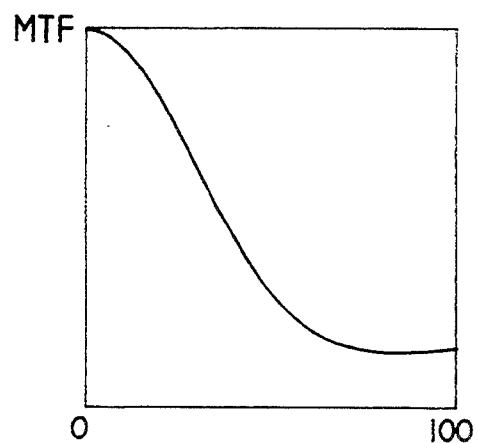
FIG. 11 shows a graph illustrating an MTF at a wide position of the first embodiment of the electronic image pickup apparatus according to the present invention.
Figure 12:
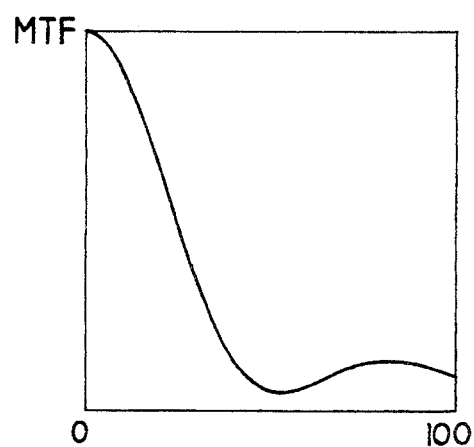
FIG. 12 shows a graph illustrating an MTF at a tele position of the first embodiment of the electronic image pickup apparatus according to the present invention.

FIG. 11 and FIG. 12 show graphs illustrating MTF's at a wide position and a tele position of the first embodiment of the image pickup apparatus according to the present invention which has numerical data to be described later. In this numerical data, however, those of quartz filters 6 and 7 are not listed.

An optical low pass filter which is to be used in the first embodiment of the present invention may be a filter having the shape of surface thereof illustrated in FIG. 7, or one of the filters having the sectional shapes which are shown in FIG. 6A, FIG. 6B and FIG. 13 and rotated relative to the optical axis. Further, this optical low pass filter may have the shape shown in FIG. 14. The refracting surface shown in FIG. 13 has a shape which is concave at the central portion thereof in the vicinity of the optical axis and flat around the center. Each of the refracting surfaces illustrated in FIG. 14A and FIG. 14B has a shape which is inclined as a whole like those of the refracting surfaces shown in FIG. 6A and FIG. 6B. In FIG. 14A, the planar surface opposite to the refracting surface is perpendicular to the optical axis, whereas the planar surface opposite to the refracting surface is also inclined relative to the optical axis in FIG. 14B.

Listed below are numerical data of the first embodiment of the image pickup apparatus according to the present invention and those of the first type of optical low pass filter which is to be used in the first embodiment:

$f = 22.636 \sim 42.793$, $F/4.9 \sim 9.3$, object distance $= -1000$ $r_1 = \infty$ (stop)
$\quad d_1 = 0.484$
$r_2 = \infty$
$\quad d_2 = 0.8 \quad\quad n_1 = 1.51633 \quad \nu_1 = 64.15$
$r_3 = \infty$
$\quad d_3 = 2.8$
$r_4 = \infty$
$\quad d_4 = 1 \quad\quad n_2 = 1.51633 \quad \nu_2 = 64.15$
$r_5 = \infty$
$\quad d_5 = 3.1$
$r_6 = 13.71$
$\quad d_6 = 1.37 \quad\quad n_3 = 1.72 \quad \nu_3 = 50.25$ -continued $r_7 = -13.71$
$\quad d_7 = 1 \quad\quad n_4 = 1.78472 \quad \nu_4 = 25.71$
$r_8 = \infty$
$\quad d_8 = 5.134 \sim 7.703$
$r_9 = -6.812$
$\quad d_9 = 1.5 \quad\quad n_5 = 1.84666 \quad \nu_5 = 23.78$
$r_{10} = -3.705$
$\quad d_{10} = 0.8 \quad\quad n_6\ 1.62374 \quad \nu_6 = 47.1$
$r_{11} = 8.719$
$\quad d_{11} = 7.527 \sim 1.251$
$r_{12} = 18.929$
$\quad d_{12} = 2.76 \quad\quad n_7 = 1.62041 \quad \nu_7 = 60.06$
$r_{13} = -13.442$
$\quad d_{13} = 0.2$
$r_{14} = 9.197$
$\quad d_{14} = 4.71 \quad\quad n_8 = 1.51633 \quad \nu_8 = 64.15$
$r_{15} = -9.197$
$\quad d_{15} = 0.8 \quad\quad n_9 = 1.85026 \quad \nu_9 = 32.28$
$r_{16} = 23.081$
$\quad d_{16} = 2.171 \sim 5.879$
$r_{17} = \infty$
$\quad d_{17} = 1 \quad\quad n_{10} = 1.51633 \quad \nu_{10} = 64.15$
$r_{18} = \infty$ shape of refracting surface ($r_5$)

(A) data of low pass filter corresponding to FIG. 3
$\quad 0 < r \leqq 1$, $C_0 = 0$, $C_1 = 8.2 \times 10^{-4}$, $1 < r \leqq 2$
$\quad C_0 = 8.2 \times 10^{-4}$
$\quad C_1 = -8.2 \times 10^{-4}$ (B) data 1 of low pass filter corresponding to FIG. 7
$\quad 0 < r \leqq 2.2$
$\quad C_0 = 0$
$\quad C_1 = 6.21340780482349713 \times 10^{-4}$
$\quad C_2 = -1.11831431665536618 \times 10^{-3}$
$\quad C_3 = 1.72326254774251052 \times 10^{-2}$
$\quad C_4 = -7.49470157979507039 \times 10^{-2}$
$\quad C_5 = 0.15375365501776678$
$\quad C_6 = -0.17470277510871939$
$\quad C_7 = 0.11630783747263494$
$\quad C_8 = -4.52714464390924533 \times 10^{-2}$
$\quad C_9 = 9.56245557825196896 \times 10^{-3}$
$\quad C_{10} = -8.48110854637978561 \times 10^{-4}$ (C) data 2 of low pass filter corresponding to FIG. 7
$\quad 0 < r \leqq 1.9$
$\quad C_0 = 0$
$\quad C_1 = 6.98116188060607758 \times 10^{-4}$
$\quad C_2 = 3.16776369268199085 \times 10^{-5}$
$\quad C_3 = -2.53997915527410557 \times 10^{-4}$
$\quad C_4 = 1.69910819567360878 \times 10^{-3}$
$\quad C_5 = -1.00618592831366177 \times 10^{-2}$
$\quad C_6 = 2.59231882276316659 \times 10^{-2}$
$\quad C_7 = -3.17627108805453862 \times 10^{-2}$
$\quad C_8 = 1.9706279862760988 \times 10^{-2}$
$\quad C_9 = -6.01906185353107658 \times 10^{-3}$
$\quad C_{10} = 7.21487026929249018 \times 10^{-4}$ (D) data 3 of low pass filter corresponding to FIG. 7
$\quad 0 < r \leqq 1.9$
$\quad C_0 = 0$
$\quad C_1 = 5.98410923155050407 \times 10^{-4}$
$\quad C_2 = 2.67892063030759041 \times 10^{-5}$
$\quad C_3 = -2.15027456191388931 \times 10^{-4}$
$\quad C_4 = 1.4457242736981412 \times 10^{-3}$
$\quad C_5 = -8.60047940280224323 \times 10^{-3}$
$\quad C_6 = 2.21876770919958392 \times 10^{-2}$
$\quad C_7 = -2.7198850592359095 \times 10^{-2}$
$\quad C_8 = 1.6878252736166768 \times 10^{-2}$
$\quad C_9 = -5.15576206337112989 \times 10^{-3}$
$\quad C_{10} = 6.180304607001828 \times 10^{-4}$ (E) data 4 of low pass filter corresponding to FIG. 7
$\quad 0 < r \leqq 2.2$
$\quad C_0 = 0$
$\quad C_1 = 5.99973411495760274 \times 10^{-4}$
$\quad C_2 = 7.24078912223179768 \times 10^{-7}$
$\quad C_3 = -9.50298609445933418 \times 10^{-6}$
$\quad C_4 = 1.28239522689032291 \times 10^{-4}$
$\quad C_5 = -1.09084425624676046 \times 10^{-3}$
$\quad C_6 = 3.41265021400184634 \times 10^{-3}$
$\quad C_7 = -4.60857251099639799 \times 10^{-3}$
$\quad C_8 = 2.9131337750895013 \times 10^{-3}$
$\quad C_9 = -8.65112114233603337 \times 10^{-4}$
$\quad C_{10} = 9.80516170458266827 \times 10^{-5}$ (F) data 5 of low pass filter corresponding to FIG. 7

-continued $0 < r \leq 2.2$
$C_0 = 0$
$C_1 = -6.21386025668877481 \times 10^{-4}$
$C_2 = 1.11903042234138932 \times 10^{-3}$
$C_3 = -1.72370859561942237 \times 10^{-2}$
$C_4 = 7.49614215496832575 \times 10^{-2}$
$C_5 = -0.153780579745271$
$C_6 = 0.17473340572566055$
$C_7 = -0.1163293334441247$
$C_8 = 4.52805238737387303 \times 10^{-2}$
$C_9 = -9.56456858123039266 \times 10^{-3}$
$C_{10} = 8.48319025793002385 \times 10^{-4}$ (G) data 6 of low pass filter corresponding to FIG. 7
$0 < r \leq 1.9$
$C_0 = 0$
$C_1 = 7.29467950111891425 \times 10^{-4}$
$C_2 = -7.20406256342096506 \times 10^{-3}$
$C_3 = 0.11227931692366647$
$C_4 = -0.48029263512608256$
$C_5 = 0.97855628529132503$
$C_6 = -1.1214666672199971$
$C_7 = 0.76512149197889504$
$C_8 = -0.30918978501733992$
$C_9 = 6.84811578855889364 \times 10^{-2}$
$C_{10} = -6.41739833484116645 \times 10^{-3}$ (H) data of low pass filter corresponding to FIG. 6
$0 < r \leq 1$,
$A_0 = 0$, $A_1 = 0.5 \times 10^{-3}$, $B_1 = 0.45 \times 10^{-3}$,
$1 < r \leq 2$,
$A_0 = z (x^2 + y^2 = 1)$, $A_1 -0.5 \times 10^{-3}$,
$B_1 = -0.45 \times 10^{-3}$ (I) data of low pass filter corresponding to FIG. 13
$0 < r \leq 2.2$
$C_0 = 0$
$C_1 = 1.18202302586474311 \times 10^{-3}$
$C_2 = 1.02432495935523004 \times 10^{-3}$
$C_3 = -6.20002963466144939 \times 10^{-3}$
$C_4 = 1.52073827862137124 \times 10^{-2}$
$C_5 = -1.88737777155327342 \times 10^{-2}$
$C_6 = 1.30665516375023426 \times 10^{-2}$
$C_7 = -5.32356937854670548 \times 10^{-3}$
$C_8 = 1.27413320587890262 \times 10^{-3}$
$C_9 = -1.66204863233887403 \times 10^{-4}$
$C_{10} = 9.1386676289853178 \times 10^{-6}$ wherein the reference symbols $r_1$, $r_2$, ... represent radii of curvature of respective lens elements, the reference symbols $d_1$, $d_2$, ... designate airspaces reserved between the lens elements, the reference symbols $n_1$, $n_2$, ... denote refractive indices of media of the lens elements, etc., and the reference symbols $\nu_1$, $\nu_2$, ... represent Abbe's numbers of the media of the lens elements and so on. Further, the reference symbol $r_5$ designates a refracting surface including a point or a line at which differential coefficients are discontinuous, and the reference symbols $r_1$ through $r_3$ denote numerical data on the side of the emergency end surface of an endoscope.

In the numerical data of the first embodiment, the reference symbol (A) indicates data on a shape of the refracting surface of the optical low pass filter. Further, the reference symbols (B), (C), (D), (E), (F) and (G) represent numerical data expressing shapes of the refracting surfaces of the optical low pass filter shown in FIG. 7, the reference symbol (H) designates numerical data expressing a shape of the refracting surface of the optical low pass filter illustrated in FIG. 6, and the reference symbol (I) denotes numerical data expressing a shape of the refracting surface of the optical low pass filter shown in FIG. 13.

Figure 2:
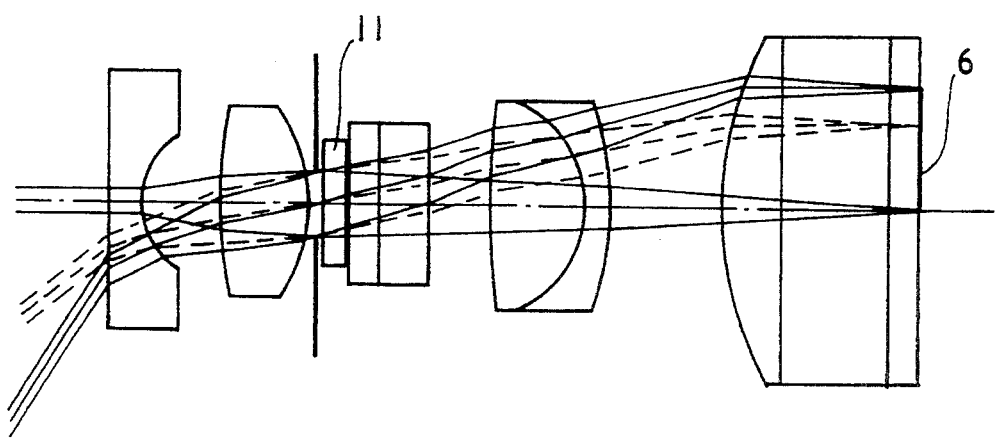
FIG. 2 shows a sectional view illustrating a composition of a second embodiment of the electronic image pickup apparatus according to the present invention.

FIG. 2 shows a sectional view illustrating the composition of the second embodiment of the image pickup apparatus according to the present invention. In the image pickup apparatus preferred as the second embodiment, an optical low pass filter 11 of the first type described above is disposed after an aperture stop arranged in an objective lens system of a television camera. Usable as the optical low pass filter 11 is an optical low pass filter which has any one of the shapes of the refracting surfaces shown in FIG. 3, FIG. 6, FIG. 7 and FIG. 13.

Now, description will be made of a second type of the image pickup apparatus according to the present invention. The second type of image pickup apparatus is configured so as to sample images at discontinuously distributed points, and comprises image pickup devices which have Nyquist frequency limits for sampling, an imaging optical system which includes an aperture stop and functions to form images of an object on the image pickup devices, and a refracting surface which is disposed in the vicinity of the aperture stop and has the second type of optical low pass effect. This refracting surface satisfies the following condition (E):

(E) $S/2 \leq f_R \sin \{|\theta_m| \ |n_1-n_0|/n_0\} \leq 3S$ $|\theta_m| \leq 90°$ wherein the reference symbol S represents a minimum sampling interval of the image pickup devices for obtaining brightness signals, the reference symbol $|\theta_m|$ designates a maximum value in absolute of a component in a sampling direction of a difference between an inclination angle of a normal to the refracting surface having the optical low pass effect and an inclination angle of a normal to a standard surface of the refracting surface, the reference symbols $n_0$ and $n_1$ denote refractive indices of media which are located on the object side and the image side respectively of the surface having the optical low pass effect, and the reference symbol $f_R$ represents a focal length of an optical system which is disposed on the image side of the aperture stop.

Figure 29:
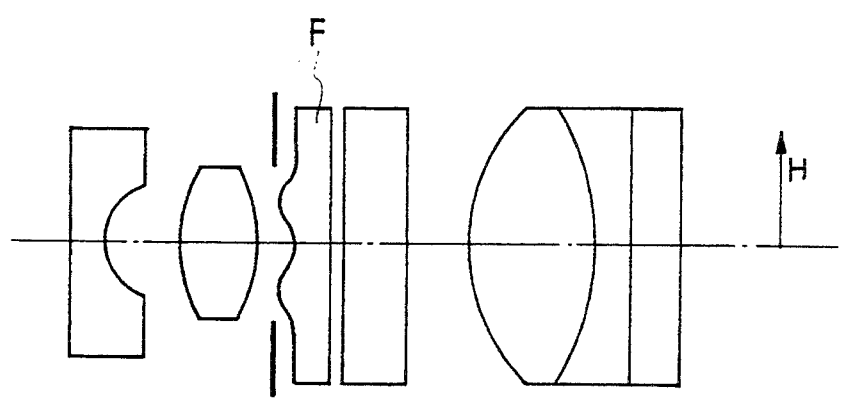
FIG. 29 shows a sectional view illustrating a second type of image pickup apparatus according to the present invention.

As a method for imparting the optical low pass effect to the refracting surface, there is available, for example, a method to produce aberrations of higher orders having uniform directivity on images formed on an image surface. FIG. 29 shows a sectional view illustrating a composition of an optical system which adopts this method. Disposed immediately after the aperture stop in this optical system is a filter F which has a surface nearly in a shape of waves formed for a cycle or longer in the horizontal direction so that the images are blurred by the aberrations of the higher orders only in a horizontal scanning direction on the image pickup devices. This filter F has a nearly cylindrical shape on a plane which is perpendicular to the horizontal scanning direction on the image pickup devices.

Figure 30:
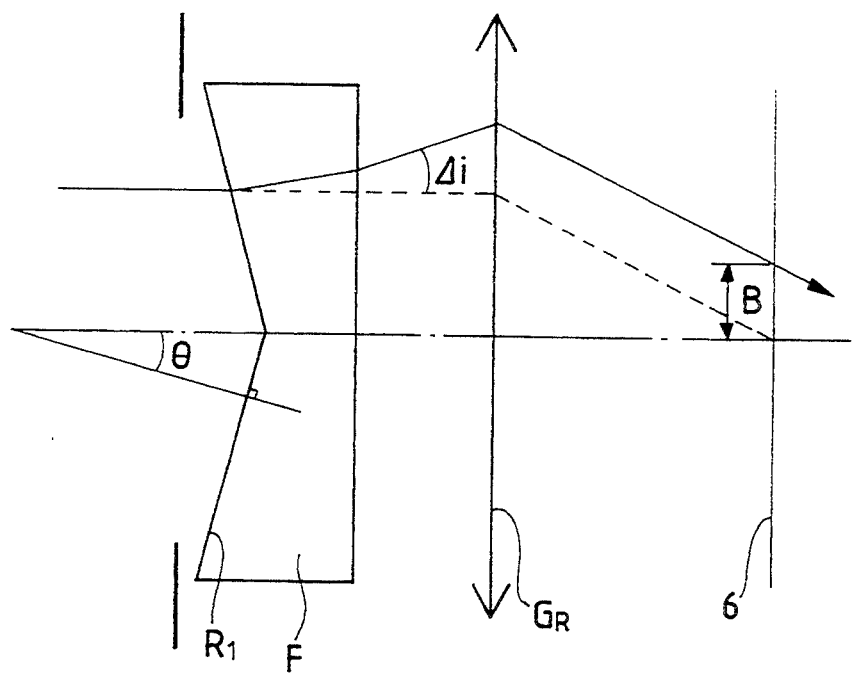
FIG. 30 shows a sectional view descriptive of the optical low pass filter of the second type which is to be used in the image pickup apparatus according to the present invention.

FIG. 30 schematically illustrates a rear lens unit $G_R$ which is disposed after the aperture stop in the optical system having the composition described above. Disposed in the optical system illustrated in this drawing are the rear lens unit which has a focal length $f_R$ and the filter F having a surface $R_1$ whose normal has an inclination angle of $\theta$ relative to the optical axis.

So far as spherical aberration is corrected favorably in the rear lens unit $G_R$, axial ray is focused onto an image surface 6, for example, as indicated by a dashed line. When the filter F is disposed, however, the axial rays are refracted by the surface $R_1$ of the filter F and has an angle of $\Delta_i$ relative to the optical axis. In this condition, departure of the axial ray on the image surface 6 from the optical axis is expressed by the following formula (iii):

$$B = f_R \sin\{\theta(n_1 - n_0)/n_0\} \quad \text{(iv)}$$

wherein $\Delta_i \approx \theta\{(n_1-n_0)/n_0\}$, and the reference symbols $n_0$ and $n_1$ represent refractive indices of media located on the object side and the image side respectively of the surface $R_1$.

Hence, it is possible to express B in the form shown below:

$$B = f_R \sin\{\theta(n_1 - n_0)/n_0\} \quad \text{(iv)}$$

Figure 31:
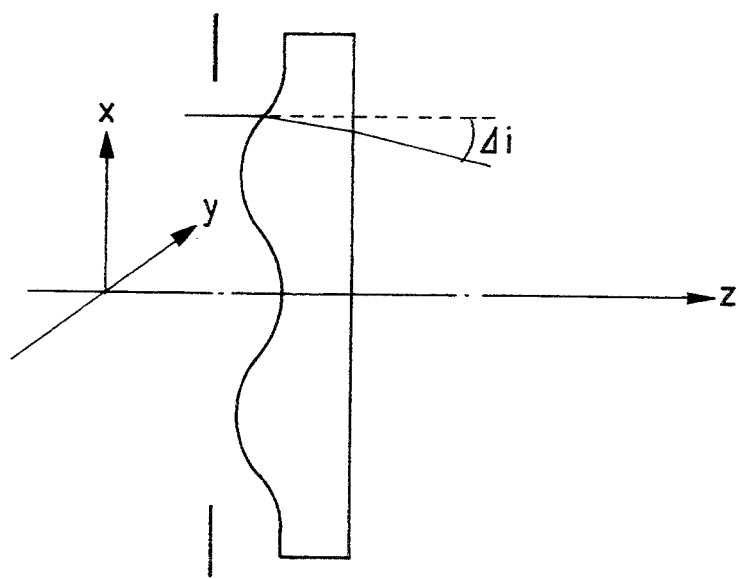
FIG. 31 shows a sectional view illustrating a fundamental shape of the optical low pass filter of the second type which is to be used in the image pickup apparatus according to the present invention.

FIG. 31 shows the second type of refracting surface which has a shape different from the shape of the refracting surface shown in FIG. 30. The shape of the refracting surface illustrated in FIG. 31 is more complicated than that of the refracting surface illustrated in FIG. 30 and undulated.

When the optical axis is taken as the z axis, the scanning direction on CCD is taken as the x axis and the direction perpendicular to the scanning direction is taken as the y axis in FIG. 31, the undulated shape shown in FIG. 31 can be expressed by the following formula (v):

$$z = f(x) \quad \text{(v)}$$

In this case, a change $\Delta_i$ of angle of the axial ray which is caused by the inclination of the surface can be expressed by the following formula:

$$\Delta_i = df(x)/dx \quad \text{(vi)}$$

From the formula (iii) mentioned above, we obtain:

$$B = f_R \sin\{(df(x)/dx)(n_1 - n_0)/n_0\}$$

Further, aberrations of higher orders which are produced by the second type of refracting surfaces having the optical low pass effect are as illustrated in FIG. 32A, FIG. 32B and FIG. 33A, FIG. 33B respectively.

Figure 32A:
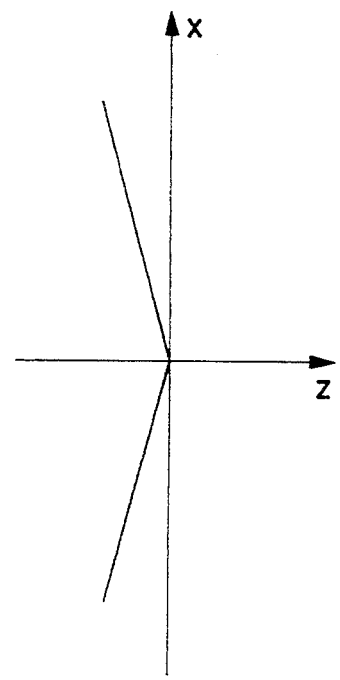
FIG. 32A shows a graph illustrating departure, as measured from a standard surface, of the surface of the optical low pass filter shown in FIG. 30.

FIG. 32A illustrates departure of the refracting surface from the standard surface thereof. The standard surface means here an image surface on which spherical aberration is corrected in the optical system and is not always a planar surface.

Figure 32B:
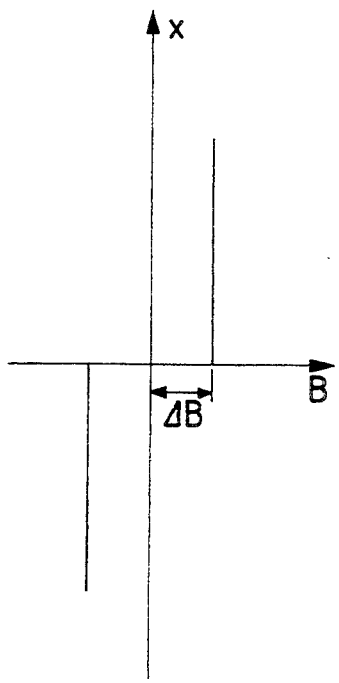
FIG. 32B shows a graph illustrating distances as measured from the optical axis to a surface on which images are formed by the optical low pass filter shown in FIG. 30.

Further, FIG. 32B visualizes values of B which are calculated by using the formula (iii).

When the refracting surface having the shape described above is disposed in the imaging optical system, an image of a spot on an object is formed as an image which is separated into two portions. In FIG. 32B, the reference symbol $\Delta B$ represents a maximum value in absolute of B. Accordingly, this image has an MTF which is similar to a cosine curve as illustrated in FIG. 34B.

Figure 33A:
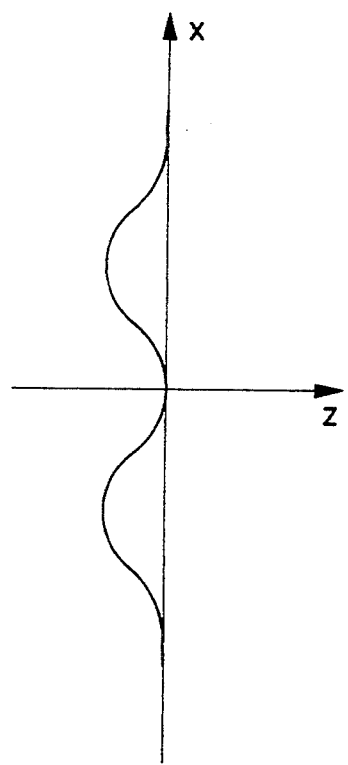
FIG. 33A shows a graph illustrating departure, as measured from a standard surface, of the surface of the optical low pass filter shown in FIG. 31.
Figure 33B:
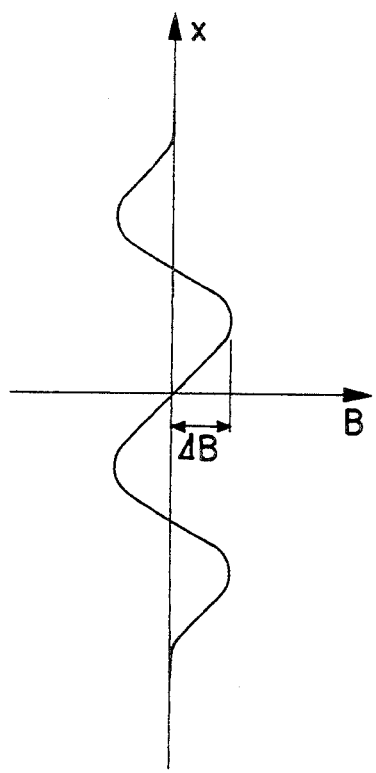
FIG. 33B shows a graph illustrating distances as measured from the optical axis to surface on which images are formed by the optical low pass filter shown in FIG. 31.
Figure 34B:
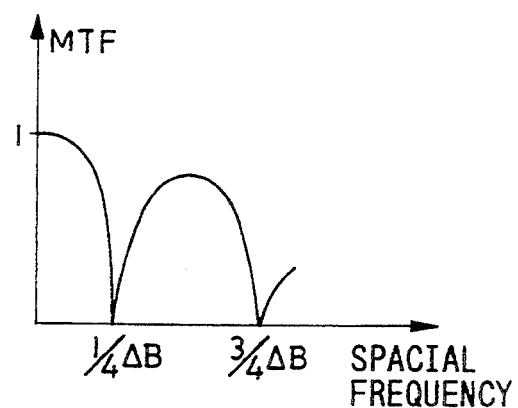
Figure 35A:
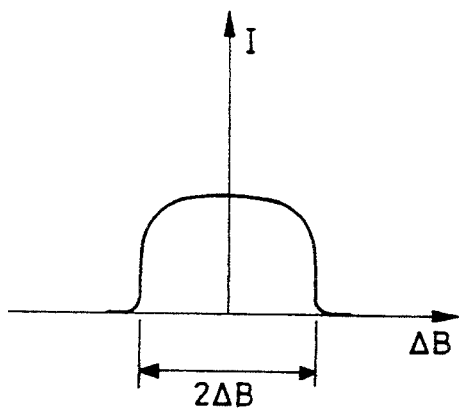
FIG. 35A and FIG. 35B show diagrams illustrating light intensities on images formed in the x direction by an imaging optical system using the optical low pass filter shown in FIG. 31 and an MTF of the imaging optical system respectively.
Figure 35B:
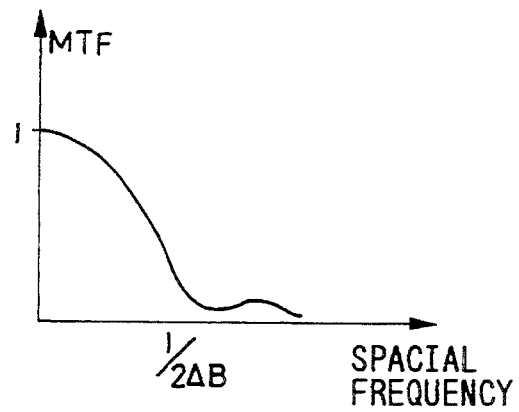

FIG. 33A shows a diagram of a refracting surface which has a shape undulated for a cycle or longer relative to a standard surface within a range of the aperture of the aperture stop. Spherical aberration of higher order which is produced by this refracting surface has a shape as shown in FIG. 33B as is understood from the formula (vii). When the refracting surface having the shape shown in FIG. 33A is disposed in the imaging optical system, light intensity distribution is nearly rectangular as shown in FIG. 35A. Further, this spot image has an MTF which is suppressed low at high frequencies as shown in FIG. 35B, though it is lower than the MTF illustrated in FIG. 34B at low frequencies.

Figure 36A:
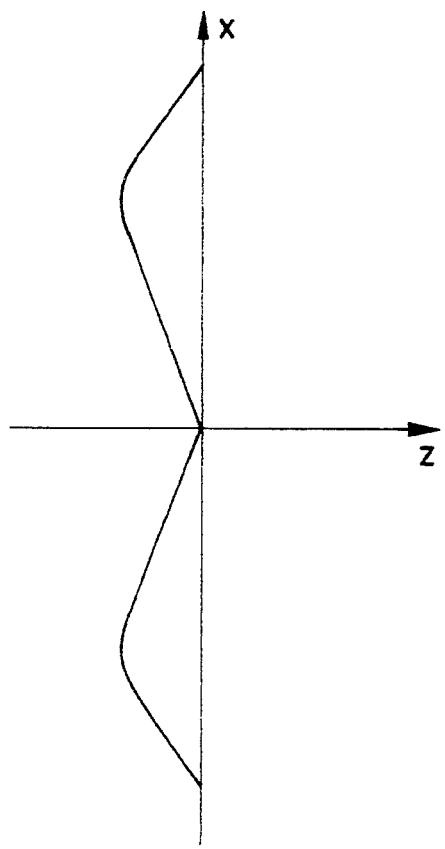
FIG. 36A and FIG. 36B show diagrams illustrating a shape and departure, from a standard surface respectively of another optical low pass filter of the second type.
Figure 36B:
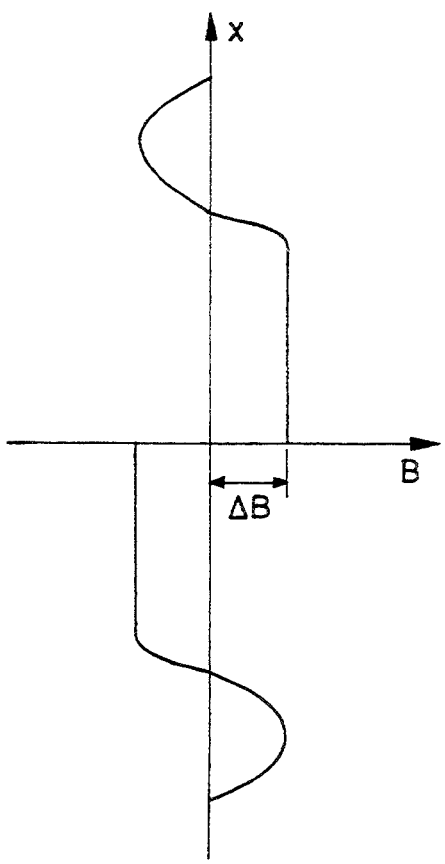

Furthermore, it is conceivable to design a refracting surface having the optical low pass effect as a surface which is configured, as illustrated in FIG. 36A, in a shape consisting of a combination of the shapes of the refracting surfaces having the optical low pass effect shown in FIG. 30 and FIG. 31. By disposing the refracting surface having the shape consisting of the combination described above in the imaging optical system, it is possible to obtain such as MTF as illustrated in FIG. 37B.

Description has been made above of the shapes (sectional shapes) of the refracting surfaces only in one direction on a surface as well as the optical low pass effects available with these refracting surfaces. However, it is possible to produce the optical low pass effect in a different direction, for example, in a direction perpendicular to the horizontal scanning direction on CCD's by using a refracting surface as an additional surface which has the shape described above. Further, it is possible to adopt a refracting surface having a shape which produces the optical low pass effect in different two or more directions on this surface or a refracting surface which has a shape rotationally symmetrical with regard to the optical axis.

A shape of the refracting surface which produces the optical low pass effect simultaneously in two directions (x direction and y direction) is expressed by the following formula (viii):

$$z = f(x) \cdot g(y) \quad \text{(viii)}$$

Further, a shape of the refracting surface which produces the rotationally symmetrical optical low pass effect is expressed by the formula (ix) shown below:

$$z = f(r) \quad \text{(ix)}$$

wherein $r = \sqrt{x^2 + y^2}$

The second type of the refracting surface having the optical low pass effect which is to be used in the image pickup apparatus according to the present invention is formed by deforming one of the surfaces disposed in the imaging optical system. Therefore, a standard surface for this refracting surface is the surface which is to be deformed in the imaging optical system having favorably corrected aberrations. Speaking more concretely, the refracting surface having the optical low pass effect which is to be used in the image pickup apparatus according to the present invention is disposed, in most cases, in the vicinity of a pupil of the imaging optical system. Consequently, a surface on which spherical aberration is minimum in the imaging optical system is selected as the standard surface.

In the image pickup apparatus according to the present invention, the standard surface is a planar surface, a spherical surface, an ellipsoid of rotation or a hyperbolic surface of rotation. When the standard surface is a spherical surface, for example, a surface which has such a radius of curvature as to minimize spherical aberration thereon is selected as the standard surface. When the standard surface is a spherical surface, departure of the refracting surface from the standard surface thereof is the so-called departure from the reference sphere thereof.

Figure 34A:
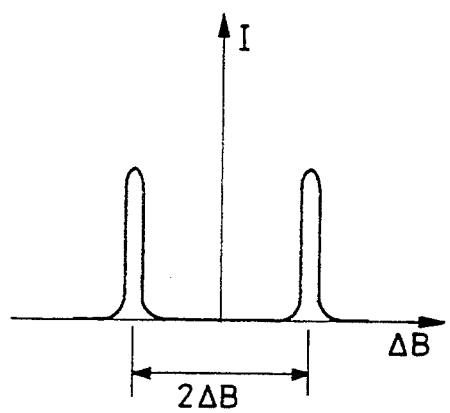
FIG. 34A and FIG. 34B show diagrams illustrating light intensities in the x direction on a spot image formed by an imaging optical system using the optical low pass filter shown in FIG. 30 and an MTF of the imaging optical system respectively.
Figure 37A:
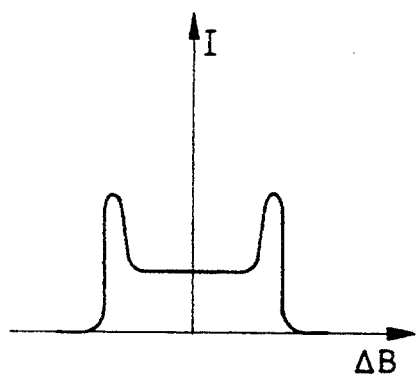
FIG. 37A and FIG. 37B show graphs illustrating light intensities on a spot image formed by an imaging optical system using the optical low pass filter shown in FIG. 36A and an MTF of this imaging optical system respectively.
Figure 37B:
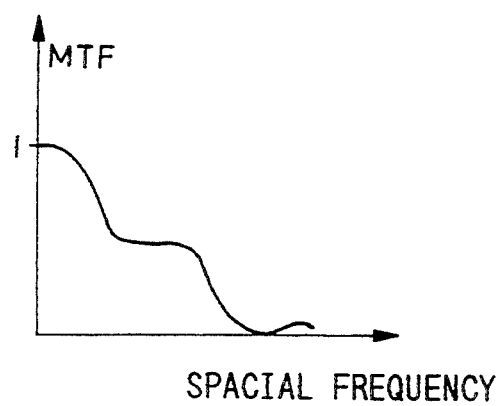
Figure 38:
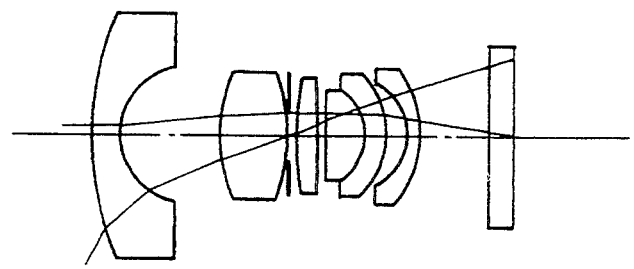
FIG. 38 and FIG. 39 show sectional views illustrating compositions of the conventional imaging optical systems.

A value of $\Delta B$ determines a value of a diameter of a spot image as is understood from FIG. 34A, FIG. 35A and FIG. 37A. When an angle formed between a normal to the second type of refracting surface and anormal to the standard surface is represented by $\theta$, and a maximum value of $\theta$ is designated by $\theta_m$, $\Delta B$ has a value which is expressed by the formula (x) shown below in each case where the formula (iv) or (v) applies to the refracting surface:

$$\Delta B = f_R \sin \left[ |\theta_m| \{(n_1 - n_0)/n_0\} \right] \quad (x)$$

wherein $|\theta_m| < 90°$

A simultaneous type of solid-state image pickup device which is adopted mainly under the current trend is the one which is based on the method reported by "single CCD coloring method in field storage mode" on pages 89 and 90, No. 10, Vol. 37 issued by Television Academy Society.

Figure 40:
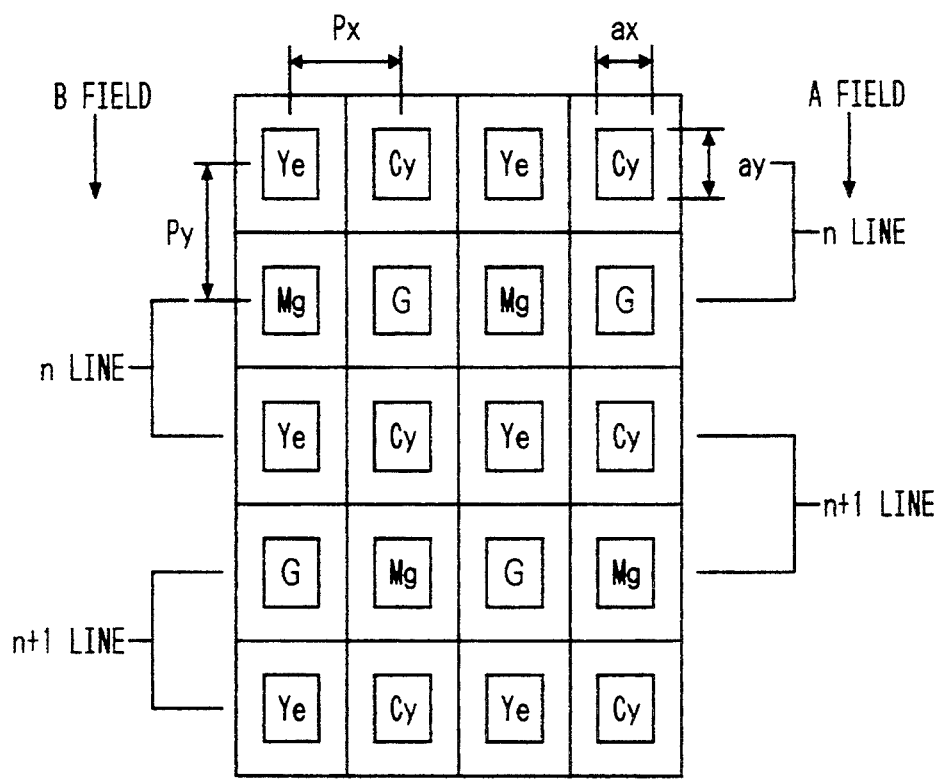
FIG. 40 shows a diagram illustrating an example of a manner in which images are picked up by image pickup devices.

The image pickup method reported by the literature mentioned above is adapted so as to mix signals of two picture elements adjacent to each other in the vertical direction (the up-down direction in FIG. 40) at a stage of image signal readout by disposing an array of color filters having the color arrangement shown in FIG. 40 before solid-state image pickup devices. Speaking concretely, horizontal scanning is performed in a first field (field A) while mixing pairs of picture elements in the vertical direction as shown on the right side as shown in FIG. 40, whereas the horizontal scanning is performed in a second field (field B) while mixing pairs of picture elements deviated in the vertical direction for a distance of one pitch between two picture elements as shown on the left side. When brightness signals on n line and (n+1) line in the field A are represented by $Y_{An}$ and $Y_{An+1}$ respectively, brightness signals on the n line and the (n+1) line in the B field are designated by $Y_{Bn}$ and $Y_{Bn+1}$ respectively, and electric charges on the respective picture elements given by rays which have passed through the filters are denoted by Mg (magenta), Ye (yellow), G (green) and Cy (cyanic) respectively, brightness signals are obtained follows:

$$Y_{An} = (Ye + Mg) + (Cy + G) = Y_{An+1} = (Ye + G) + (Cy + Mg) = 2R + 3G + 2B$$

$$Y_{Bn} = (Mg + Ye) + (G + Cy) = Y_{Bn+1} = (G + Ye) + (Mg + Cy) = 2R + 3G + 2B$$

In an image pickup apparatus which uses image pickup devices of the type described above, it is general that an optical low pass filter to be used in an imaging optical system has an optical low pass frequency $\nu_c$ in the horizontal direction satisfying the following relationship:

$$\nu_n \leq \nu_c \leq \nu_s \quad (xi)$$

wherein the reference symbol $\nu_s$ represents a frequency for sampling the brightness signals on the solid-state image pickup devices mentioned above and the reference symbol $\nu n$ designates a Nyquist frequency limit.

The cut-off frequencies for sampling the spot images having the light intensity distributions shown in FIG. 34A, FIG. 35A and FIG. 37A respectively can be varied, as is understood from FIG. 34B, FIG. 35B and FIG. 37B respectively, within a range defined below:

$$\tfrac{1}{2}\Delta B \leq \nu_c \leq \tfrac{3}{2}\Delta B \quad (xii)$$

When a minimum sampling interval of the solid-state image pickup devices for obtaining the brightness signals is represented by s, we obtain the following relationship:

$$\nu_s = 1/S = 2\nu_n \quad (xiii)$$

on an assumption of $\nu_s = \nu_n$, the following relationship is obtained from the formulae (xi) and (xii):

$$\tfrac{1}{2}\Delta B \leq \nu_n \leq \tfrac{3}{2}\Delta B \quad (xiv)$$

When $\Delta_c$ is equal to $\nu_s$, there establishes the following relationship between $\nu_s$ and $\Delta B$:

$$\tfrac{1}{2}\Delta B \leq \nu_s \leq \tfrac{3}{2}\Delta B \quad (xv)$$

From the formula (xv) mentioned above, the formula (xiii), the formula (xi) and the formula (xii), we obtain the relations (xvi) and (xvii) shown below:

$$\tfrac{1}{2}S \leq \Delta B \leq 3/2S \quad (xvi)$$

$$S \leq \Delta B \leq 3S \quad (xvii)$$

From the formulae (xvi) and (xvii), we obtain the following relation (xviii):

$$\tfrac{1}{2}S \leq \Delta B \leq 3S \quad (xviii)$$

Further, we obtain the following relationship(E) from the formula (xvii) and the formula expressing $\Delta B$:

$$(E) \; S/2 \leq f_R \sin \{|\theta_m|(n_1 - n_0)/n_0\} \leq 3S \;\; (|\theta_m| < 90°)$$

The formulae expressing the relations described above is summarized as the condition (E) mentioned above. That is to say, the spurious signals which are produced by the image pickup devices and the image of the object formed on the light receiving surfaces of the image pickup devices can be eliminated by disposing a refracting surface satisfying the condition (E) in the imaging optical system.

If the upper limit of the above-mentioned condition (E) is exceeded, the optical low pass effect will be too strong and images will be blurred. If the lower limit of the condition (E) is exceeded, in contrast, it will be impossible to eliminate moiré.

In case of the second type of optical low pass filter illustrated in FIG. 30, a medium located on the incidence side of the refracting surface $R_1$ has a refractive index which is lower than that of a medium located on the emergence side of the refracting surface $R_1$. However, the description made above is applicable even when this relationship is reversed, or when the refractive index of the medium located on the incidence side is higher than that of the medium located on the emergence side. However, we must use $n_0 - n_1$ in place of $n_1 - n_0$ for applying the description made above. Accordingly, it is necessary to transform the condition (E) as follows:

$$(E) \; S/2 \leq f_R \sin \{|\theta_m| \cdot |n_1 - n_0|/n_0\} \leq 3S \;\; |\theta_m| < 90°$$

Figure 17:
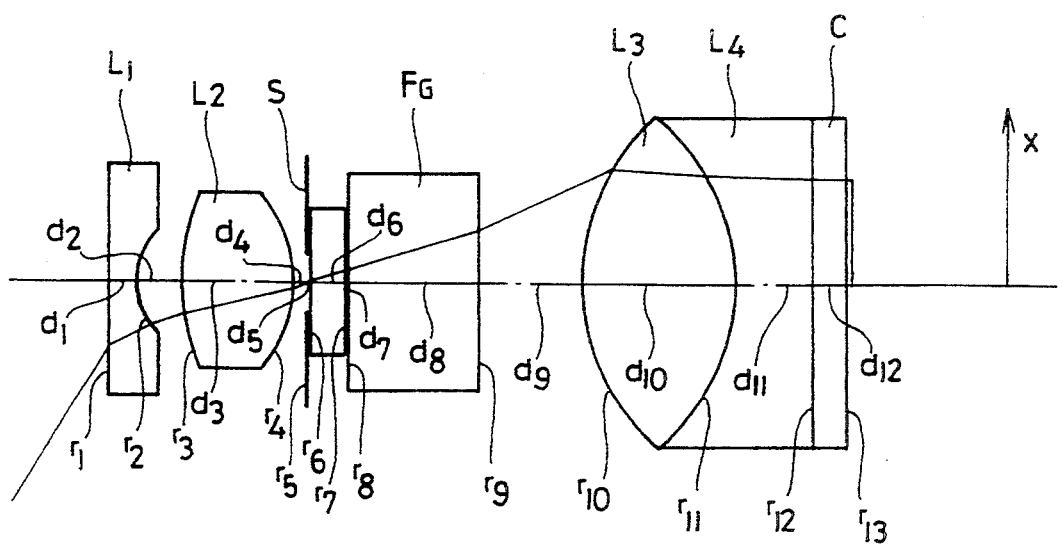
FIG. 17 shows a sectional view illustrating a composition of a third embodiment and a fifth embodiment of the electronic image pickup apparatus according to the present invention.

FIG. 17 illustrates a second type of the imaging optical system of the image pickup apparatus according to the present invention. This second type of imaging optical system comprises a first lens element $L_1$ having a negative refractive power, a second lens element $L_2$ having a positive refractive power, a third positive lens element $L_3$ and a fourth negative lens element $L_4$. Further, this imaging optical system comprises a filter group $F_G$ which is disposed between an aperture stop S and the third lens element $L_3$ as well as a cover glass plate C for CCD's which are disposed on the image side of the fourth lens element $L_4$. Furthermore, the refracting surface having the optical low pass effect is designed as an image side surface $r_4$ of the second lens element $L_2$.

This imaging optical system has a composition wherein the third lens element $L_3$ is cemented to the fourth lens element $L_4$ so as to compose a cemented lens component which has a function of a field lens and the birefringent plate used in the conventional imaging optical system is omitted.

In this imaging optical system, positive astigmatism which is produced by a concave surface of the first lens element $L_1$ is cancelled by producing negative astigmatism with the second lens element $L_2$. Accordingly, coma and astigmatism which are produced in a front lens unit (consisting of the first lens element and the second lens element) are corrected in the front lens unit itself.

A rear lens unit (the lens cemented component consisting of the third lens element and the fourth lens element) has the function of a field lens as described above so that the principal ray is incident nearly perpendicularly on the image pickup devices. Further, it is possible to suppress, to a low level, the astigmatism which is to be produced by an object side surface of the third lens element $L_3$ by reserving an airspace having a certain large width between the aperture stop S and the third lens element $L_3$ so that the third lens element $L_3$ does not have too strong a refractive power. Furthermore, the front lens unit is configured so as to produce negative astigmatism so that this astigmatism is balanced with the astigmatism which is produced by the object side surface of the third lens element $L_3$.

In the second type of the imaging optical system of the image pickup apparatus according to the present invention, a broad airspace is reserved between the aperture stop S and the third lens element $L_3$ for facilitating correction of aberrations, and the filter group is disposed in the airspace as described above.

By selecting the composition described above, aberrations other than chromatic aberration are corrected favorably in the third embodiment of the image pickup apparatus according to the present invention. Chromatic aberration can be corrected independently in the front lens unit and the rear lens unit. Speaking concretely, the chromatic aberration can be cancelled between the first lens element $L_1$ and the second lens element $L_2$ by disposing the second positive lens element $L_2$ in the front lens unit. In the rear lens unit, negative chromatic aberration which is produced by the third lens element $L_3$ can be corrected with the cemented surface formed between the third lens element $L_3$ and the fourth lens element $L_4$.

In addition, it is possible to configure the imaging optical system compact by strengthening the power of the first lens element $L_1$ and that of the second lens element $L_2$.

The second type of the image pickup apparatus can be configured compact since one of the surfaces disposed in the imaging optical system as the refracting surface having the optical low pass effect as described above.

In the third embodiment of the present invention described above, the rear lens unit has a focal length $f_R$ of 2.531 and sampling interval is selected at 5.42 μ. Image pickup devices used in the third embodiment are those illustrated in FIG. 40 and of the type based on the method reported by the above-mentioned literature.

When the direction of the optical axis is taken as the z axis, the horizontal direction on the CCD's is taken as the x axis, the direction perpendicular to the x axis is taken as the y axis, and a function expressing a shape of a surface is represented by $z=f(x) g(y)$, the second type of the refracting surface used in the third embodiment is expressed by the following formulae (xix) and (xx):

$$f(x)=Ex^4+Fx^6+Gx^8+Hx^{10}+Ix^{12}+Jx^{14}+Kx^{16} \qquad \text{(xix)}$$

$$g(y)=C \text{ (C: constant)} \qquad \text{(xx)}$$

Figure 19:
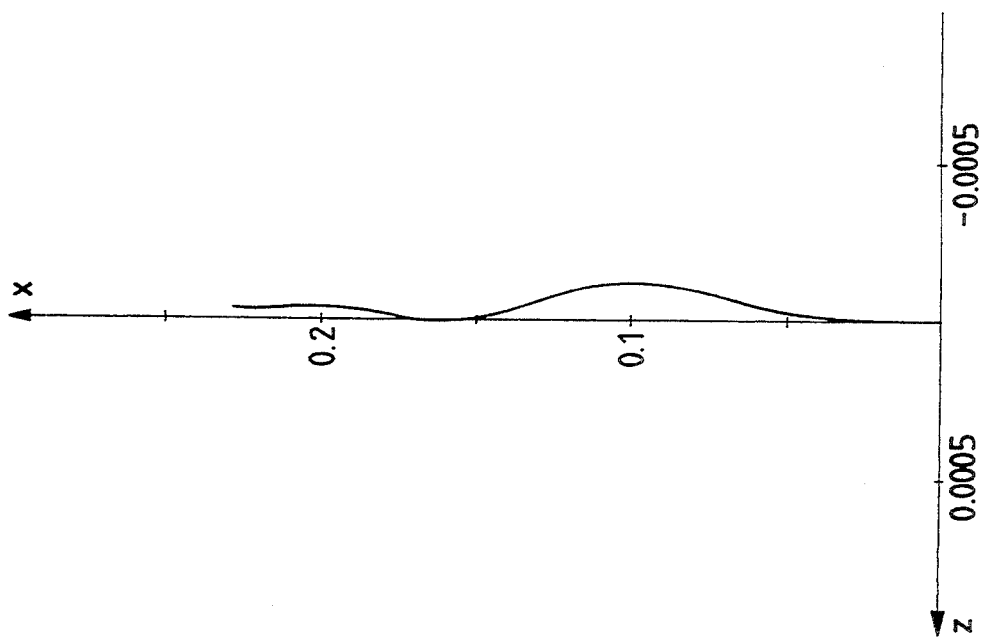
FIG. 19 shows a sectional view illustrating a shape of a surface of an optical low pass filter of a second type which is to be used in the third embodiment of the image pickup apparatus according to the present invention.

A shape which is expressed by the formulae mentioned above is as illustrated in FIG. 19 on an x-z plane. That is to say, this surface is undulated only in the x direction or the horizontal scanning direction on the CCD's. In the third embodiment, the aperture stop has a diameter of 0.4 mm.

Figure 20:
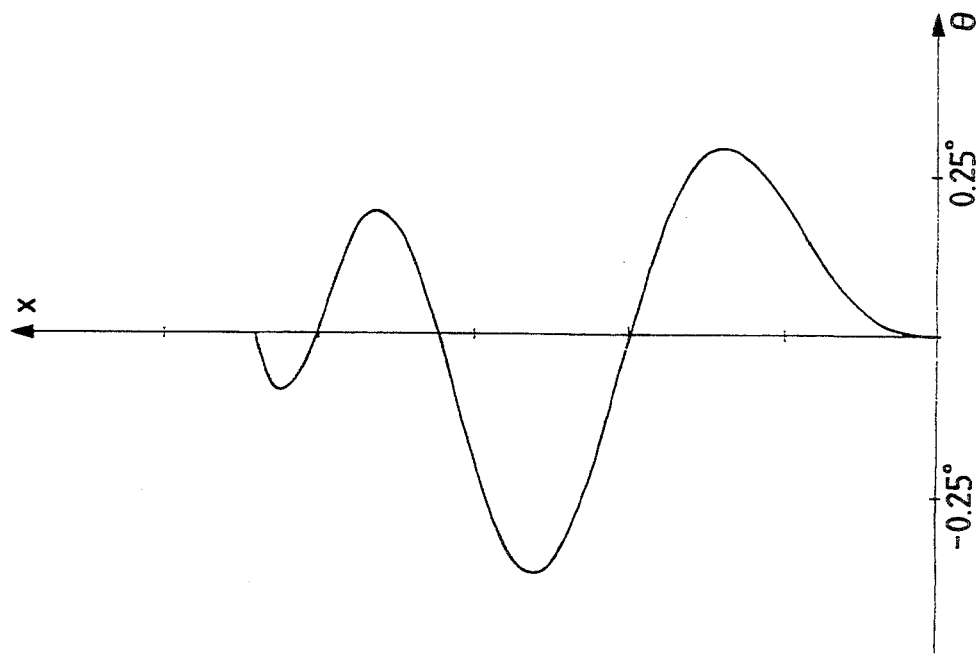
FIG. 20 shows a graph illustrating a variation of inclination angle of the surface of the optical low pass filter of the second type.
Figure 21:
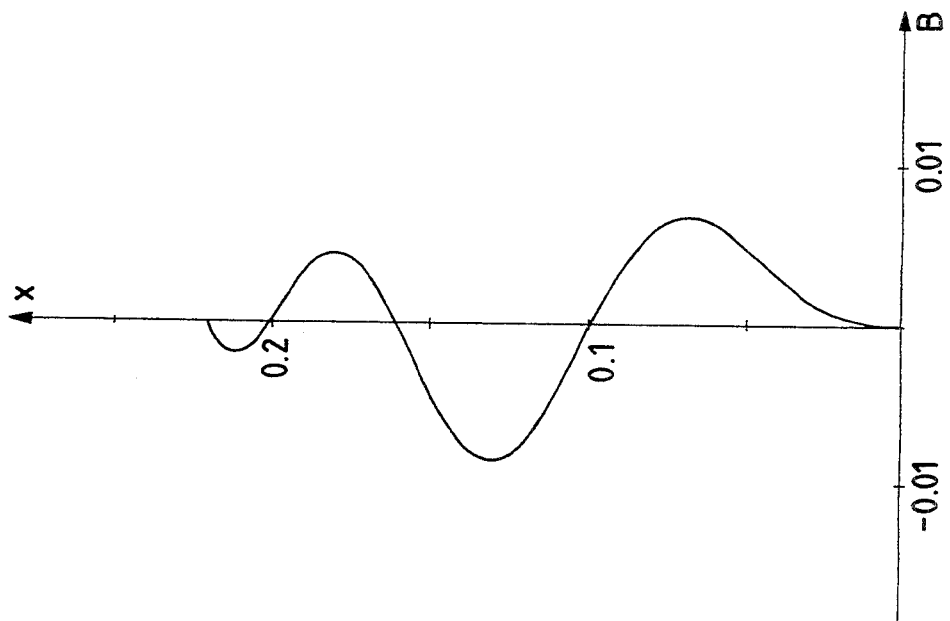
FIG. 21 shows a graph illustrating deviation B of an imaged location of an axial ray which is caused by the optical low pass filter shown in FIG. 19.

A variation of the inclination angle $\theta$ of this refracting surface is illustrated in FIG. 20, wherein the reference symbol $\theta_m$ has a value of $|\theta_m|=0.377°$. Further, FIG. 21 shows departure of axial ray $B=f_R \sin\{\theta(n_1-n_0)/n\}$ from the optical axis as measured on the light receiving surface which is caused by the refracting surface. B has a value of 0.0087 when $\theta$ is equal to $\theta_m$.

Figure 22:
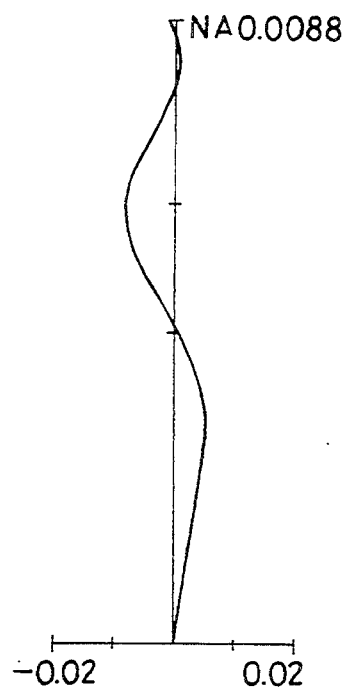
FIG. 22 shows a graph illustrating lateral aberrations in the imaging optical system used in the third embodiment of the present invention.

Passages for rays travelling through this imaging optical system were simulated by using a computer for determining lateral aberrations in the horizontal scanning direction on the CCD's (the x direction). FIG. 22 shows a graph illustrating these aberrations expressed on the Gaussian image surface. This graph is well coincident with that shown in FIG. 21 and proves that the imaging optical system comprising the refracting surface satisfying the condition (E) is capable of accomplishing the object of the present invention.

Figure 23:
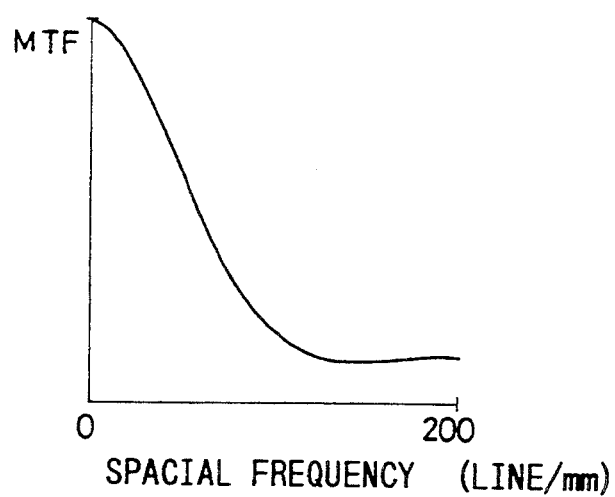
FIG. 23 shows a graph illustrating an MTF of the imaging optical system used in the third embodiment of the present invention.

FIG. 23 shows an MTF of the third embodiment (the second type of the image pickup apparatus according to the present invention) which selects a sampling frequency of 184 lines/mm.

The third embodiment of the present invention has the numerical data listed below:

| f = 1.000, F/5.535, IH = 0.8134, object distance = −9.8592 | | | |
|---|---|---|---|
| $r_1 = \infty$ | | | |
| | $d_1 = 0.2254$ | $n_1 = 1.88300$ | $v_1 = 40.78$ |
| $r_2 = 0.5365$ | | | |
| | $d_2 = 0.3521$ | | |
| $r_3 = 1.5395$ | | | |
| | $d_3 = 0.9225$ | $n_2 = 1.64769$ | $v_2 = 33.80$ |
| $r_4 = -0.9365$ | | | |
| | $d_4 = 0.1056$ | | |
| $r_5 = \infty$ (stop) | | | |
| | $d_5 = 0.0211$ | | |
| $r_6 = \infty$ (aspherical surface) | | | |
| | $d_6 = 0.2817$ | $n_3 = 1.52287$ | $v_3 = 59.89$ |
| $r_7 = \infty$ | | | |
| | $d_7 = 0.0211$ | | |
| $r_8 = \infty$ | | | |
| | $d_8 = 1.0563$ | $n_4 = 1.52000$ | $v_4 = 74.00$ |
| $r_9 = \infty$ | | | |
| | $d_9 = 0.8190$ | | |
| $r_{10} = 1.6405$ | | | |

-continued

| | $d_{10} = 1.2622$ | $n_5 = 1.72916$ | $\nu_5 = 54.68$ |
|---|---|---|---|
| $r_{11} = -1.6059$ | | | |
| | $d_{11} = 0.6232$ | $n_6 = 1.84666$ | $\nu_6 = 23.78$ |
| $r_{12} = \infty$ | | | |
| | $d_{12} = 0.2817$ | $n_7 = 1.52287$ | $\nu_7 = 59.89$ |
| $r_{13} = \infty$ | | | |

| aspherical surface coefficients | |
|---|---|
| $E = -0.13388 \times 10^2$, | $F = 0.19179 \times 10^4$, |
| $G = -0.10971 \times 10^6$, | $H = 0.32108 \times 10^7$, |
| $I = -0.50865 \times 10^8$, | $J = 0.41464 \times 10^9$, |
| $K = -0.13616 \times 10^{10}$ | |
| $f_R = 2.531$ | |

Figure 18:
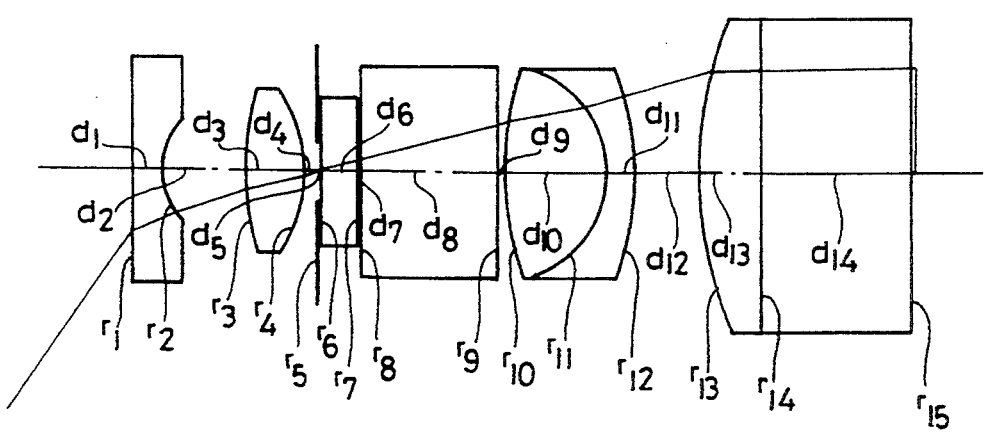
FIG. 18 shows a sectional view illustrating a composition of a fourth embodiment of the electronic image pickup apparatus according to the present invention.
Figure 39:
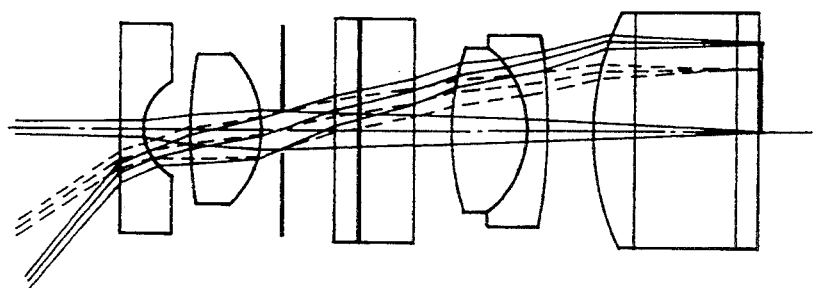

The fourth embodiment of the image pickup apparatus according to the present invention has a composition shown in FIG. 18 wherein the quartz filter used in the imaging optical system of the conventional example shown in FIG. 39 is omitted.

In the fourth embodiment of the present invention also, a surface disposed immediately after an aperture stop is designed as a refracting surface having the optical low pass effect. This refracting surface has a shape expressed as a function of $z = f(x) \times g(y)$, i.e., a product of two components perpendicularly intersecting with each other in two dimensions. Each of these components is expressed by the formula (xix) and has functions which are mentioned in the numerical data to be described later.

When the horizontal scanning direction on the CCD's is taken as the x axis and the direction perpendicular to the horizontal scanning direction is taken as the y axis, it is sufficient also for the fourth embodiment that relationship between sampling frequency in each direction and a normal to the refracting surface satisfies the condition (E).

The shapes expressed by the components of the function expressing the refracting surface may be formed on a single surface or on separate two surfaces disposed in the vicinity of the aperture stop.

Figure 24:
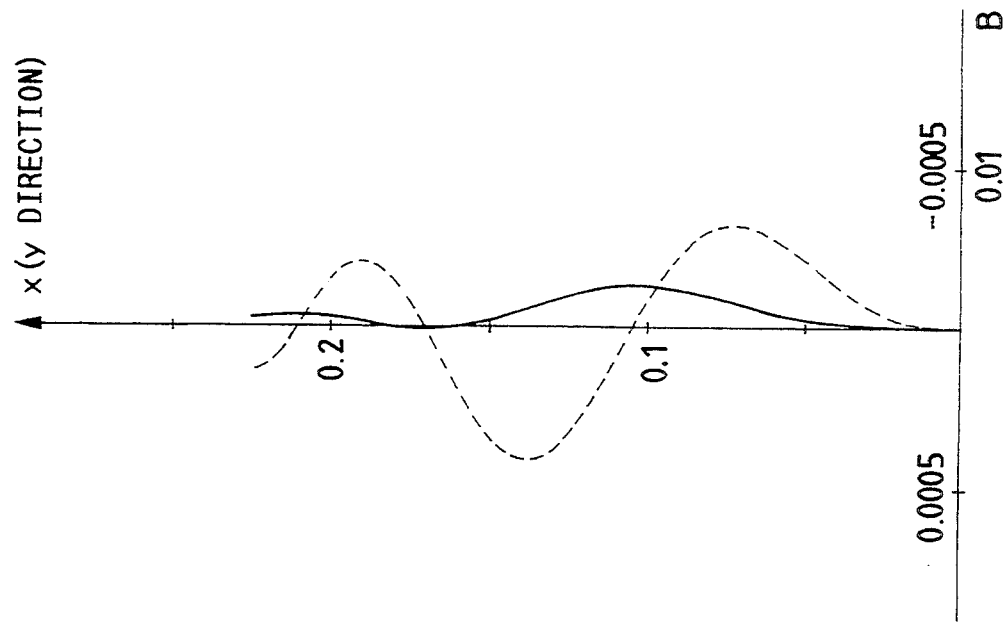
FIG. 24 shows a sectional view and a graph illustrating a shape of surface and deviation from an optical path respectively of an optical low pass filter of the second type which is to be used in the fourth embodiment of the present invention.

The fourth embodiment uses a rear lens unit which comprises a surface $r_{10}$ through a surface $r_{14}$ and has a total focal length $f_R$ of 2.415. In the fourth embodiment, sampling interval is 5.9 μ in each of the horizontal and vertical scanning directions. The refracting surface adopted in the fourth embodiment has a shape which is curved in both the x and y directions as indicated by a solid line in FIG. 24. Further, a dashed line in FIG. 24 represents a graph of $f_R \sin\{\theta(n_1 - n_0)/n_0\}$ which has a value of 0.0081.

Figure 25:
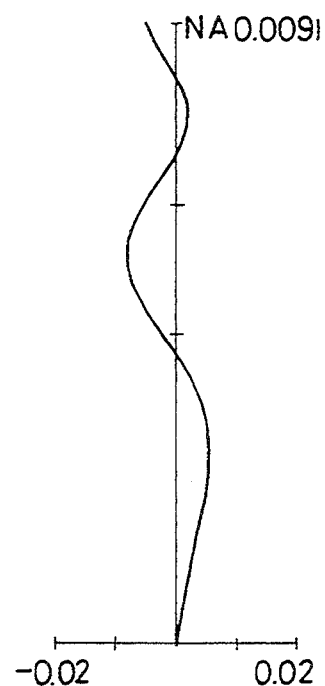
FIG. 25 shows a graph illustrating lateral aberrations in an imaging optical system which is to be used in the fourth embodiment of the present invention.
Figure 26:
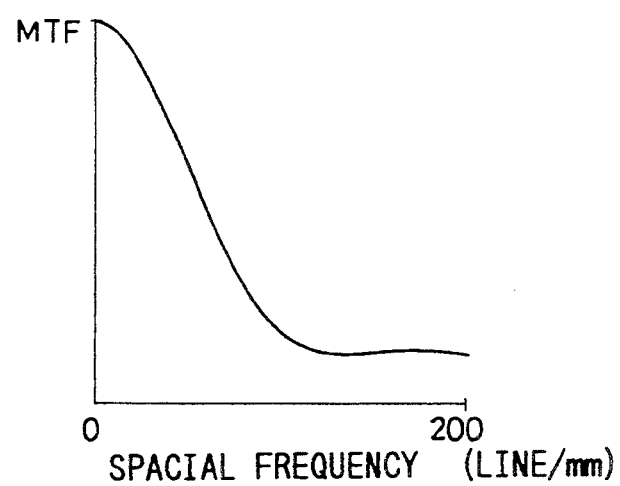
FIG. 26 shows a graph illustrating an MTF of the imaging optical system which is to be used in the fourth embodiment of the present invention.

Illustrated in FIG. 25 are amounts of lateral aberrations in the horizontal scanning direction and the vertical scanning direction on the CCD's used in the fourth embodiments, whereas MTF's in the horizontal and vertical scanning directions on the CCD's are shown in FIG. 26. Further, sampling frequency is 169.5 lines/mm in both the horizontal and vertical scanning directions on the CCD's. The image pickup apparatus preferred as the fourth embodiment poses no problem for practical use and can provide images free from moiré so far as the MTF's are lower than a level of approximately 30%.

The fourth embodiment of the present invention has the numerical data which are listed below:

| $f = 1.000$, $F/5.088$, $IH = 0.8575$, object distance $= -10.3935$ | | | |
|---|---|---|---|
| $r_1 = \infty$ | | | |
| | $d_1 = 0.2376$ | $n_1 = 1.88300$ | $\nu_1 = 40.78$ |

-continued

| $r_2 = 0.5877$ | | | |
|---|---|---|---|
| | $d_2 = 0.6713$ | | |
| $r_3 = 2.1437$ | | | |
| | $d_3 = 0.4852$ | $n_2 = 1.64769$ | $\nu_2 = 33.80$ |
| $r_4 = -1.1471$ | | | |
| | $d_4 = 0.1114$ | | |
| $r_5 = \infty$ (stop) | | | |
| | $d_5 = 0.0223$ | | |
| $r_6 = \infty$ (aspherical surface) | | | |
| | $d_6 = 0.2970$ | $n_3 = 1.52287$ | $\nu_3 = 59.89$ |
| $r_7 = \infty$ | | | |
| | $d_7 = 0.0223$ | | |
| $r_8 = \infty$ | | | |
| | $d_8 = 1.1136$ | $n_4 = 1.52000$ | $\nu_4 = 74.00$ |
| $r_9 = \infty$ | | | |
| | $d_9 = 0.0742$ | | |
| $r_{10} = 2.7122$ | | | |
| | $d_{10} = 0.8166$ | $n_5 = 1.51633$ | $\nu_5 = 64.15$ |
| $r_{11} = -0.8444$ | | | |
| | $d_{11} = 0.2240$ | $n_6 = 1.84666$ | $\nu_6 = 23.78$ |
| $r_{12} = -2.1696$ | | | |
| | $d_{12} = 0.5197$ | | |
| $r_{13} = 2.8953$ | | | |
| | $d_{13} = 0.5197$ | $n_7 = 1.77250$ | $\nu_7 = 49.66$ |
| $r_{14} = \infty$ | | | |
| | $d_{14} = 1.2177$ | $n_8 = 1.52287$ | $\nu_8 = 59.89$ |
| $r_{15} = \infty$ | | | |

| aspherical surface coefficients | |
|---|---|
| $E = -0.11428 \times 10^2$, | $F = 0.14731 \times 10^4$, |
| $G = -0.75823 \times 10^5$, | $H = 0.19968 \times 10^7$, |
| $I = -0.28464 \times 10^8$, | $J = 0.20879 \times 10^9$, |
| $K = -0.61693 \times 10^9$ | |
| $f_R = 2.413$ | |

The fifth embodiment of the image pickup apparatus according to the present invention adopts an imaging optical system and CCD's which are the same as those used in the third embodiment, and a refracting surface having the optical low pass effect which is different in shape from that selected for the third embodiment.

The shape of the refracting surface having the optical low pass effect can be expresses by a polynominal or on polar coordinates as follows:

$$z = f(r) = a_0 + a_1 r \quad (0 \leq r \leq 0.14)$$

$$= \sum_{n=4}^{16} C_n r^n \quad (0.14 < r)$$

wherein the reference symbol n represents an even number.

In the fifth embodiment of the present invention, $a_0$ and $a_1$ have the values which are specified below:

| $a_0 = 3.46353 \times 10^{-4}$ | $a_1 = -4.9483 \times 10^{-3}$ |
|---|---|

Further, $C_n$ has a value which are listed below:

| $C_4 = -0.33398 \times 10$ | $C_6 = 0.23727 \times 10^3$ |
|---|---|
| $C_8 = -0.67312 \times 10^4$ | $C_{10} = 0.97698 \times 10^5$ |
| $C_{12} = -0.76755 \times 10^6$ | $C_{14} = 0.31031 \times 10^7$ |
| $C_{16} = -0.50536 \times 10^7$ | |

Figure 27:
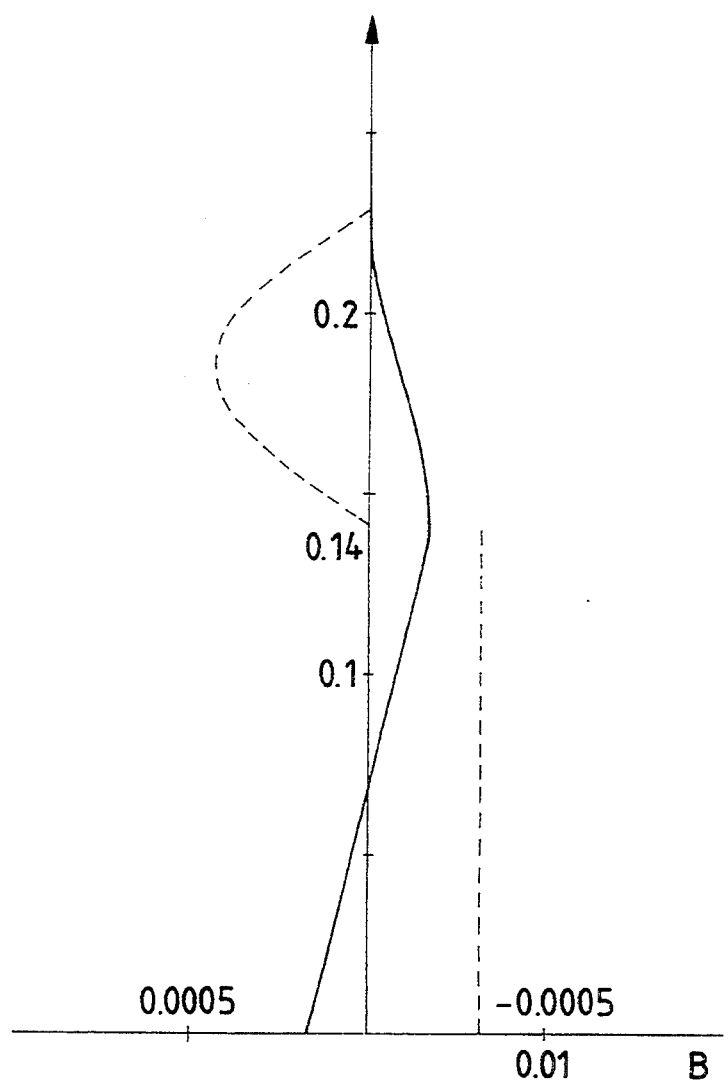
FIG. 27 shows a diagram and a graph illustrating a shape of a surface and deviation from the optical axis respectively of an optical low pass filter of the second type which is to be used in the fifth embodiment of the image pickup apparatus according to the present invention.

The shape of the refracting surface having the optical low pass effect used in the fifth embodiment is visualized by a solid line in FIG. 27. On this surface, differential coefficients are discontinuous or differentiation is impossible at points of $r = 0$ and $r = 0.14$.

In FIG. 27, a dashed line represents $f_R \sin\{\theta(n_1-n_0)/n_0\}$ which is selected for the fifth embodiment.

Figure 28:
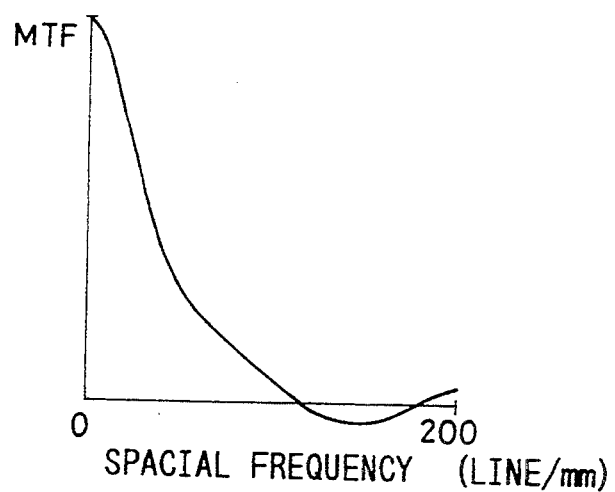
FIG. 28 shows a graph illustrating an MTF of an imaging optical system which is to be used in the fifth embodiment of the present invention.

FIG. 28 illustrates an MTF adopted for the fifth embodiment. Comparing the MTF of the fifth embodiment with that of the third embodiment, it will be understood that the MTF of the fifth embodiment is suppressed lower because the refracting surface having the optical low pass effect includes a portion which is represented by a straight line. In each of the third through the fifth embodiments of the present invention described above, a standard surface for the refracting surface having the optical low pass effect is a planar surface. Comparing spherical aberration which is to be produced by this standard surface with spherical aberrations which are to be produced by surfaces which are to be obtained by modifying the standard surface without changing the other numerical data (r, d, n and $\nu$) of each of lens elements disposed in the imaging optical system, the spherical aberration to be produced by the planar standard surface is a minimum.

The image pickup apparatus according to the present invention may be utilized for observing images projected onto a television monitor on the basis of electrical signals provided from the image pickup devices in a condition where the image pickup apparatus is attached to an eyepiece lens of an endoscope.

When the image pickup apparatus is used in this condition, problems which are described below are posed by changing a magnification and/or aperture size of the imaging optical system.

FIG. 64 shows a schematic sectional view illustrating a state wherein a television camera is connected to an eyepiece lens of a fiberscope. In this drawing, the reference numeral 1 represents an image guide fiber bundle of the fiberscope, the reference numeral 2 designates an eyepiece lens, the reference numeral 4 denotes an imaging optical system, the reference numeral 5 represents an optical low pass filter consisting of a birefringent plate or the similar member, the reference numeral 6 designates an image pickup device such as a CCD and the reference numeral 7 denotes an image pickup apparatus. In the composition illustrated in FIG. 64, an image of an object appearing on an end surface of emergence of the image guide fiber bundle 1 is reimaged on a light receiving surface of the image pickup device 6 by the eyepiece lens 4 through the optical low pass filter 5. The image guide fiber bundle consists, as is known well, a large number of optical fibers which are bundled so as to be densely arranged in six directions. The end surface of emergency of this image guide fiber bundle is illustrated on an enlarged scale in FIG. 65 and only cores 18 of the optical fibers which are regularly arranged in the fiber bundle are glowing brightly. It can therefore be considered that an image of the end surface of emergence is an image on which the glowing portions of the cores 18 are modulated according to brightness distribution on the image and that a spatial frequency spectrum of this image of the object has spectrum components of the image of the object at a basic frequency which is determined dependently on arrangement of the cores 18. Consequently, spurious signals are produced due to interference between the basic frequency mentioned above and a sampling frequency of the image pickup device. When the image pickup apparatus is connected to another fiber scope of a different type, the spurious signals described above may be eliminated insufficiently. FIG. 44A and FIG. 44B illustrate states wherein an image pickup apparatus which comprises the imaging optical system 4 and the image pickup device 6 is connected to eyepiece lenses of fiberscopes which are equipped with image guide fiber bundles 1 and 1' different from each other. In these drawings, the reference numeral 24 used in FIG. 44A and the reference numeral 24' used in FIG. 44B represent exit pupils of eyepiece lenses 2 and 2' which are different from each other. Since light bundles emerging from the image guide fiber bundles 1 and 1' have the same numerical aperture (NA) in the fiberscopes, an F number of the imaging optical system 4 is determined dependently on the eyepiece lenses 2, 2' and sizes of the exit pupils 24, 24'.

Further, fiberscopes are equipped, dependently on purposes of application thereof, image guide fiber bundles which are different in thickness. For convenience of observation, however, it is desirable to almost uniformalize sizes of visual fields to be observed through eyepiece lenses. For this reason, an eyepiece lens having a high magnification is combined with a thin image guide fiber bundle and an eyepiece lens having a low magnification is used for a thick image guide fiber bundle. In order to uniformalize brightness of images which are to be observed through the fiberscopes, it is necessary to enlarge a diameter of the exit pupil 24 when an eyepiece lens having a low magnification is used as shown in FIG. 44A and reduce a diameter of the exit pupil 24' when an eyepiece lens having a high magnification is used as shown in FIG. 44B since the light bundles emerging from the image guide fiber bundles have a constant NA. Therefore, the imaging optical system 4 should desirably have a small F number when the eyepiece lens has the low magnification or a large F number when the eyepiece lens has the high magnification.

Now, let us assume that optical fibers arranged in two image guide fiber bundles have the same thickness and are arranged at a pitch of p in two image guide fiber bundles, for example, as shown in FIG. 44A and FIG. 44B. Les us further assume that the combination of the eyepiece lens 2 having the low magnification and the imaging optical system 4 illustrated in FIG. 44A has a total magnification of $\beta L$, and that the combination of the eyepiece lens 2' and the imaging optical system 4 shown in FIG. 44B has a total magnification of $\beta H$.

An image of a mesh-like pattern on the end surface of emergence of the image guide fiber bundle is projected onto the light receiving surface of the image pickup device at a ratio of $1/(p \cdot \beta L)$ and made finer when the eyepiece lens 2 having the low magnification is used as shown in FIG. 44A, whereas an image of the mesh-like pattern is projected at a ratio of $1/(p \cdot \beta H)$ and made coarser when the eyepiece lens 2' having the high magnification is adopted as illustrated in FIG. 44B. Accordingly, the basic frequency on the images of the object is enhanced when the images are picked up by a system wherein the image pickup apparatus is connected to a fiberscope equipped with an eyepiece lens having a low magnification, whereas the basic frequency on the images of object is lowered when the images are picked up by a system wherein the image pickup apparatus is connected to an endoscope equipped with an eyepiece lens having a high magnification.

Figure 65:
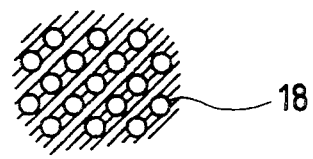
FIG. 65 shows a diagram illustrating an end surface of an optical fiber bundle which is to be used for endoscopes.
Figure 66A:
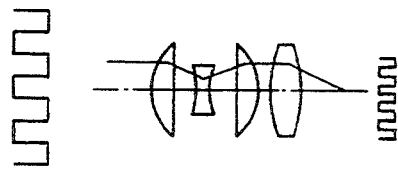
FIG. 66A and FIG. 66B show sectional views illustrating examples wherein zoom lens systems are used as imaging optical systems.
Figure 66B:
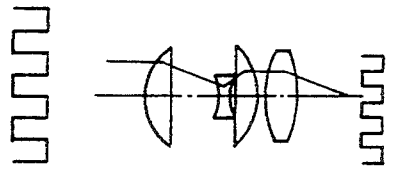

When an image of a bright-dark pattern of the cores 18 which are arranged at the pitch of p in an image guide fiber bundle as shown in FIG. 65 is imaged by the imaging optical system the image has an optional size within a range from a minimum repeating pitch of p·βL as shown in FIG. 66A to a maximum pitch of p·βH as shown in FIG. 66B. Consequently, the basic frequency on the images of the object described above varies within a range from 1/(p·βL) to 1/(p·βH).

The optical low pass filters are generally used for preventing interference between the spatial frequency components of the images of the object and sampling frequencies on the image pickup devices by lowering resolution of the images of the object at frequencies higher than a specific spatial frequency. FIG. 46 shows graphs illustrating frequency characteristics of the optical low pass filters. The spurious signals produced by an imaging optical system can be eliminated by configuring an optical low pass filter so as to zero an MTF at the basic frequency of 1/(p·βH) when the imaging optical system has a small F number (when an eyepiece lens having a low magnification is used) as indicated by a solid line a in FIG. 46. When the imaging optical system has a large F number or when the basic frequency is 1/(p·βH), for example, the optical low pass filter described above has a high MTF, exerts insufficient function to lower resolution and is ineffective for eliminating the spurious signals sufficiently. In a case where an optical low pass filter is configured so as to zero an MTF when an imaging optical system has a large F number (when an eyepiece lens having a high magnification is used) or when the basic frequency is 1/(p·βH), for example, the optical low pass filter can eliminate the spurious signals which are produced by the imaging optical system having the large F number. When the imaging optical system has a small F number or the basic frequency is 1/(p·βH), however, the MTF is zeroed at the frequency of 1/(p·βH), whereby resolution becomes lower than required and image quality is undesirably degraded.

Speaking with reference to the elimination of the spurious signals contained in images which have intense spectral components at the specific spatial frequencies such as the images formed by the fiberscopes described above, various problems are posed by the imaging optical system comprising the optical low pass filter disposed between the imaging optical system (a zoom lens system) and an image surface thereof.

The optical low pass filters are often combined adequately with birefringent plates such as quartz filters and so on. Considering a quartz filter independently, it has a spatial frequency characteristic which can be regarded as the spatial frequency characteristic of the so-called comb-shaped filter. Accordingly, the quartz filter exhibits high spatial frequency response at frequencies which are located on both sides higher and lower than the cut-off frequency. For this reason, the quartz filter exhibits an insufficient function to eliminate the spurious signals in particular cases where the images of the object have intense spectral components at specific spatial frequencies. Further, quartz is expensive and is undesirable for practical use.

As an optical filter which does not use the birefringent plate, there is known the optical low pass filter disclosed by Japanese Patent Kokai Publication No. Hei 1-151880. This optical low pass filter is of a rotationally symmetrical type and functions to produce spherical aberration or defocus the imaging optical system so as to blur images uniformly.

When the optical low pass effect is produced by the method described above, however, the cut-off frequency becomes rotationally symmetrical with regard to the origin on the coordinates of spatial frequency. In a case where resolution is different between the horizontal direction (x direction) and the vertical direction on the solid-state image pickup device, etc., it is obliged to set cut-off frequency in the direction in which the resolution is lower and the resolution is undesirably lowered.

Under the circumstances described above, it is meaningful to develop an image pickup apparatus comprising a refracting surface which can be combined with various types of optical instruments such as fiberscopes having different apertures (F numbers) and exhibits sufficiently high optical low pass effect.

Description will be made of a third type of the image pickup apparatus according to the present invention which comprises the refracting surface described above.

The third type of the image pickup apparatus according to the present invention comprises image pickup devices which are configured so as to sample images at discontinuously distributed points and an imaging optical system which functions to form images of an object on a predetermined image surface. Disposed in the imaging optical system are an aperture stop which determines an F number of the optical system, and an optical means (a refracting surface having a third type of optical low pass effect) which is arranged in the vicinity of the aperture stop and functions to produce aberrations of high orders having directivities on images formed on an image surface. This optical means is effective for preventing interference between the image pickup devices and the images of the object by lowering frequency response of the imaging optical system.

In an imaging optical system which is attached to an eyepiece lens of a fiberscope for forming images of an end surface of emergence of an image guide fiber bundle by using an exit pupil of the eyepiece lens as an aperture stop, the relationship visualized by a graph illustrated in FIG. 45 establishes between a frequency of arrangement of optical fibers in the image guide fiber bundle (a spatial frequency on images of the object) and a diameter of the aperture stop. For the graph illustrated in FIG. 45, the diameter of the aperture stop is taken as the ordinate and the spatial frequency is taken as the abscissa.

FIG. 47 illustrates a schematic perspective view illustrating a composition of the imaging optical system used in the third type of the image pickup apparatus according to the present invention. In FIG. 47, the reference numeral 4 represents an imaging lens, the reference numeral 6 designates a solid-state image pickup device and the reference symbol F denotes the third type of optical low pass filter. This filter F has a surface having undulations symmetrically with regard to the optical axis and in the direction along the horizontal scanning direction on the solid-state image pickup device. The undulated surface of the filter F is shaped properly so as to produce desired aberrations only in the horizontal direction (direction γ). As a result, spatial frequencies are different from each other between the horizontal direction and the direction perpendicular thereto on an image formed on the image pickup device 6.

Shown in FIG. 48 is a graph illustrating an extent of a spot image formed by the imaging optical system on a sectional surface in the horizontal direction of the imaging optical system. In FIG. 48, the ordinate represents a size of an aperture and the abscissa designates a distance as measured in the direction perpendicular to the optical axis which is selected for visualizing amounts of lateral aberrations representing imaged condition. The reference symbol ΔA used in FIG. 48 represents a range within which the size of the aperture is varied.

In order that an MTF is lowered by reducing the aperture and the MTF is enhanced by enlarging the aperture, the lateral aberrations must make a size oA of the spot image measured in the direction γ smaller, within the range in which the aperture is varied, than a lateral aberration $o_{min}$ which is determined by a minimum aperture within the range mentioned above. That is to say, it is necessary to control the size of the spot image measured in the direction y by producing the lateral aberrations so as to satisfy the following condition:

$$o_{min} > oA \qquad \text{(xxii)}$$

When the condition mentioned above is satisfied, the spot image formed by the imaging optical system is extended as illustrated in FIG. 49A, FIG. 49B and FIG. 49C. In these drawings, the ordinate represents light intensities on the spot image (a maximum value of the light intensity is normalized to 1) and the abscissa designates a shape of the spot image as a distance as measured in the direction perpendicular to the optical axis. Out of these drawings, FIG. 49A illustrates a condition of the spot image at the minimum aperture within the range in which the aperture is varied, FIG. 49B shows a condition of the spot image at the maximum aperture within the range in which the aperture is varied, and FIG. 49C visualizes a condition of the spot image at a middle aperture size between the minimum and the maximum.

Since the lateral aberration is constant until the aperture reaches the minimum size thereof in this imaging optical system as is seen from FIG. 48, the extent of the spot image is a rectangle which has a side equal to the distance $o_{min}$ (amounts of the lateral aberrations) as illustrated in FIG. 49A. When the size of aperture becomes larger than the minimum size thereof, rays corresponding to the distance (amounts of lateral aberrations) increase, whereby the spot image has a shape which has central protrusion of a component having width of oA as shown in FIG. 49B and an average size which is gradually reduced correspondingly. When the aperture has a larger size, the rays corresponding to the distance (amounts of lateral aberrations) becomes longest, whereby the spot image has a shape exhibiting a higher protrusion having the width of o A as illustrated in FIG. 49C, and an average size which is further smaller and close to oA.

Since it is practically impossible to produce the lateral aberrations in completely constant amounts within a certain range of aperture sizes, spot images are not formed in the shapes which are stepped as illustrated in FIG. 49A, FIG. 49B and FIG. 49C, but in shapes on which length of o is continuously varied. For conceptional understanding of spot images which are to be formed by the imaging optical system, however, it is possible to visualize these images as shown in FIG. 49A, FIG. 49B and FIG. 49C.

Now, description will be made below of the relationship between the lateral aberrations and apertures of the imaging optical system by using a special function which is defined by J. Goodman, "Introduction to Fourier Optics".

The shapes of the spot image illustrated in FIG. 49A, FIG. 49B and. FIG. 49C, when considered in one dimension only, can be expressed by a rect function which is 1 high and $o_{min}$ wide. In a special expression of function, the shapes of the spot image can be expressed by the following formula (xxiii):

$$\text{rect } (r/omin) \qquad \text{(xxiii)}$$

wherein the rect function can be expressed as follows:

$$\text{rect}(x) = \begin{array}{ll} 1 & |x| \leq 1/2 \\ 0 & |x| > 1/2 \end{array}$$

Fourier transformation of the formula (xxiii) gives an MTF in the horizontal direction on the imaging optical system, which is expressed by the following formula (xxiv):

$$omin = \text{sinc } (omin \cdot \rho) \qquad \text{(xxiv)}$$

wherein the sinc(x) is given by the following formula:

$$\text{sinc}(x) = \sin(x/2)/(x/2)$$

Further, the reference symbol ρ used in the above-mentioned formula (xxiv) represents a distance as measured from an origin on coordinates representing spatial frequencies in the horizontal scanning direction on the image pickup devices.

From the formula (xxiv) mentioned above, a cut-off frequency $\rho_{min}$ of the first order is expressed as follows:

$$\rho_{min} = 1/o_{min}$$

Now, let us examine the shape of the spot image illustrated in FIG. 49C. Since the function illustrated in FIG. 49C can be considered as an overlapping of the function shown in FIG. 49A and the one shown in FIG. 49B, the graph shown in FIG. 49C can be expressed in a form of a linear combination of the latter two functions. Let us assume for convenience of calculation that the function shown in FIG. 49A has a value of 1 at a height of I. Then, the shape of the spot image illustrated in FIG. 49C is given by the following formula:

$$f(r) = \text{rect } (r/o_{min}) + a \cdot \text{rect } (r/oA) \qquad \text{(xxv)}$$

wherein the reference symbol a represents a coefficient which is determined dependently on a ratio between the height of the portion having width of $o_{min}$ and the portion having width of oA of the shape of the spot image illustrated in FIG. 49C.

Fourier transformation F(ρ) of the formula (xxv) is expressed by the following formula (xxvi):

$$F(\sigma) = o_{min} \cdot \text{sinc } (o_{min} \cdot \sigma) + a \cdot oA \cdot \text{sinc } (oA \cdot \sigma) \qquad \text{(xxvi)}$$

A value of the formula (xxvi) which is obtained by normalizing a maximum value of I to 1 gives a spatial frequency response (MTF) of the imaging optical system in the condition (the shape of the spot image) illustrated in FIG. 49C.

Figure 51:
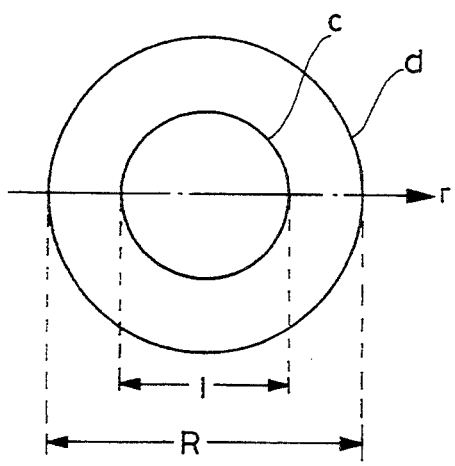
FIG. 51 shows a plan view illustrating an aperture stop.

In the formula (xxvi) mentioned above, the coefficients of the terms used in the right side represent areas of the shapes of the spot images illustrated in FIG. 49A and 49B respectively. When a ratio between these areas, is represented by A, it is expressed by the following formula (xxvii):

$$A = a \cdot oA/o_{min} \quad \text{(xxvii)}$$

wherein has a value which is determined dependently on a horizontal length of the aperture stop used in the imaging optical system. When a minimum value and a maximum value of the diameter of the aperture stop used in the imaging optical system are represented by 1 and R respectively as shown in FIG. 51, A is expressed by the following formula (xxviii):

$$A = (oA / o_{min})(R-1) \quad \text{(xxviii)}$$

On the basis of this formula (xxviii), the formula (xxvi) is transformed into the following formula (xxix):

$$(1/o_{min}) F(\sigma) = \text{sinc}(o_{min} \cdot \sigma) + A \text{ sinc}(oA \cdot \sigma) \quad \text{(xxix)}$$

As is understood from the above-mentioned formula (xxix), the MTF of the imaging optical system is varied dependently on the coefficient A of the second term of this formula, i.e., size of the aperture stop. When R has a value of 1, for example, i.e., when the aperture stop is a minimum size, $(1/o_{min}) \cdot F(\sigma)$ has a value which is expressed only by the first term of the right side of the formula (xxix) and the MTF of the imaging optical system is represented as a gently sloping curve which has a cutoff frequency at $\sigma = 1/o_{min}$. When the size of the aperture stop is not the minimum thereof, $(1/o_{min}) \cdot F(\sigma)$ has a value which is expressed not only by the first term but also by the second term of the formula (xxiv), and the MTF of the imaging optical system has a value which is not zero but expressed as follows:

$$(oA/o_{min}) = (R-1)\text{sinc}(oA \cdot \sigma)$$

Since this value is increased as R has a larger value, the cut-off frequency is not located at $\sigma = 1/o_{min}$.

On the other hand, since the sinc function has a value which is rapidly reduced at frequencies higher than the initial zero point, the cut-off frequency is located substantially at $\sigma = 1/oA$ when R has a large value.

As is understood from the foregoing description, the MTF characteristic given by the formula (xxiv) is varied as the size of the aperture changes from the minimum value toward the maximum value thereof, and the initial cut-off frequency $\sigma = 1/o_{min}$ is gradually shifted and definitely set at a new cut-off frequency of 1/oA which has a value larger than that of $1/o_{min}$. Since the cut-off frequency of the optical low pass filter is varied by changing the aperture size of the imaging optical system, the MTF of the imaging optical system is suited for accomplishing the object of the present invention.

Concrete means for obtaining an imaging optical system having the MTF described above will be explained below:

The image pickup apparatus according to the present invention is configured so as to have the MTF described above by producing a special spherical aberration in the imaging optical system adopted for the image pickup apparatus.

Figure 52A:
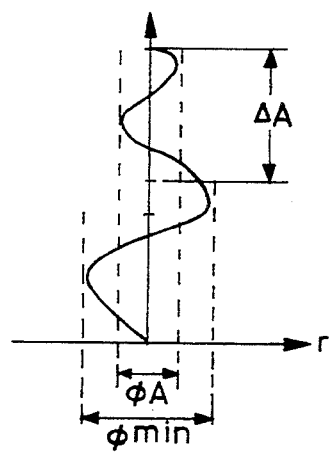
FIG. 52A and FIG. 52B show graphs illustrating typical examples of aberrations which are to be produced by the third type of optical low pass filter.
Figure 52B:
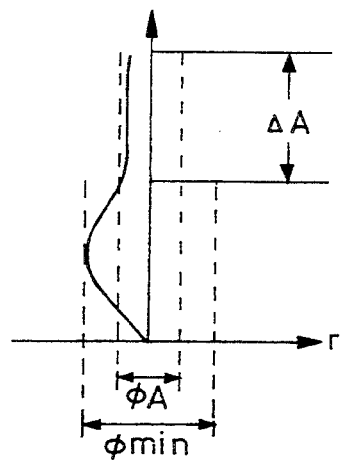

FIG. 52A and FIG. 52B show curves which visualize the above-mentioned spherical aberration as a lateral aberration. Each of these spherical aberration curves has a large swelling within a range where the aperture is small and a small swelling within another range where the aperture is large. An imaging optical system which has the spherical aberration illustrated in FIG. 52A exhibits the desired MTF nearly on the Gaussian image surface, whereas an imaging optical system which has the spherical aberration illustrated in FIG. 52B has the desired MTF when the optical system is defocused for a certain distance from the Gaussian image surface.

Figure 53:
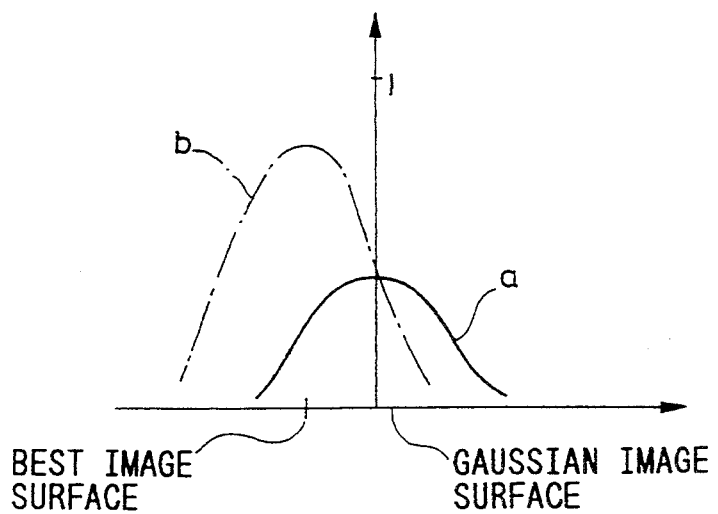
FIG. 53 shows a graph illustrating a variation of an MTF which is to be caused by defocusing.

Relationship between the MTF and defocusing distance is illustrated in FIG. 53. For the graphs shown in FIG. 53, the ordinate represents values of the MTF and the abscissa represents defocusing distances (departure from the best image surface). Both the imaging optical systems having the spherical aberrations illustrated in FIG. 52A and FIG. 52B respectively exhibit the desired MTF on the best image surface. However, the MTF of the imaging optical system which has the spherical aberration illustrated in FIG. 52B is abruptly lowered at locations apart from the best image surface since this optical system allows rays to be incident on the image surface mainly on one side only of the optical axis. Accordingly, the MTF characteristic of the imaging optical system of the type having the spherical aberration illustrated in FIG. 52B is made unstable by defocusing. In contrast, the imaging optical system of the type having the spherical aberration illustrated in FIG. 52A has the MTF which is relatively stable. Moreover, the imaging optical system of the type having the spherical aberration illustrated in FIG. 52A exhibits the effect to eliminate the spurious signals which is not lowered by defocusing since the MTF of this imaging optical system is lowered by the defocusing. The spherical aberration illustrated in FIG. 52A can easily be produced by using aspherical surfaces.

When the imaging optical system is configured as a vari-focal lens system such as a zoom lens system, it is desirable to dispose the third type of optical low pass filter F at a location on the incidence side of the lens units having the vari-focal function.

Figure 54:
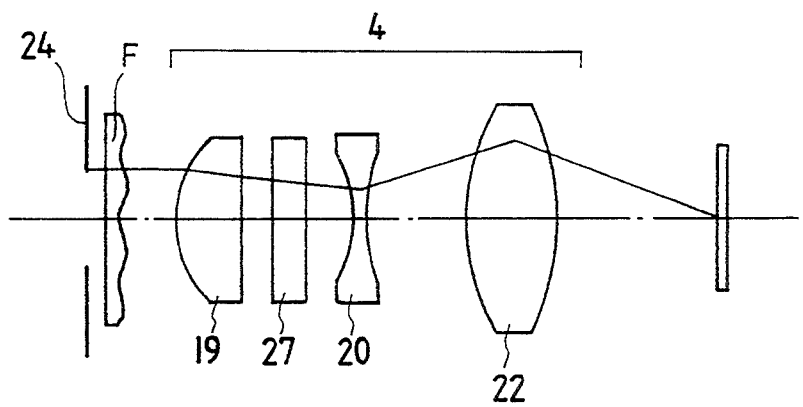
FIG. 54 shows a sectional view illustrating a fundamental composition of the third type of the image pickup apparatus according to the present invention.
Figure 55:
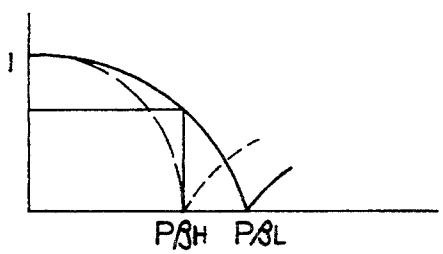
FIG. 55 shows graphs illustrating MTF's of the imaging optical systems shown in FIG. 44A and FIG. 44B respectively.
Figure 56:
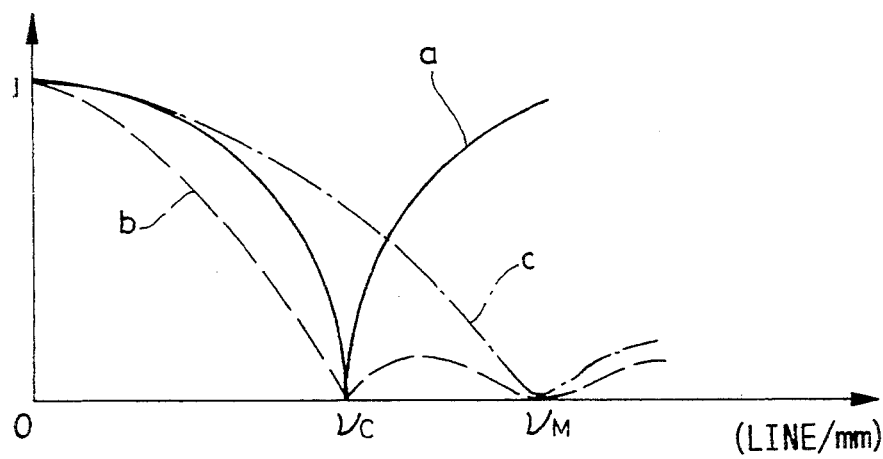
FIG. 56 shows a graph illustrating an MTF of an optical system comprising a birefringent plate.
Figure 58A:
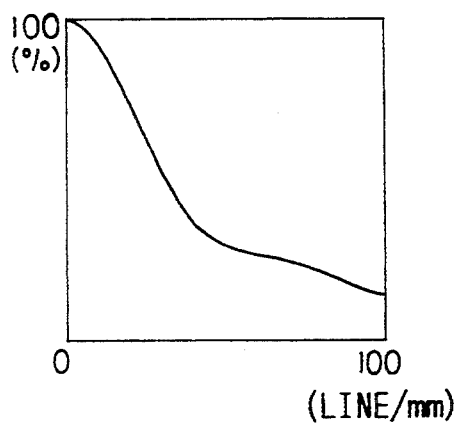
FIG. 58A, FIG. 58B, FIG. 58C and FIG. 58D show graphs illustrating MTF's at the wide position of the sixth embodiment of the image pickup apparatus according to the present invention.
Figure 58B:
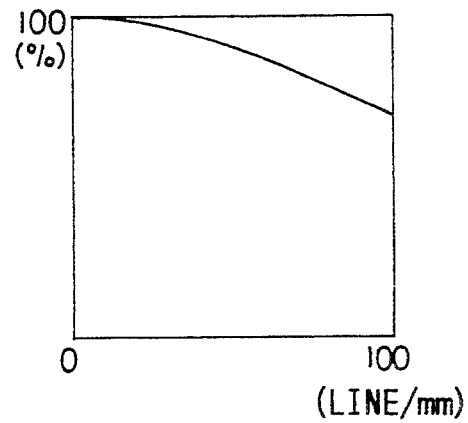
Figure 58C:
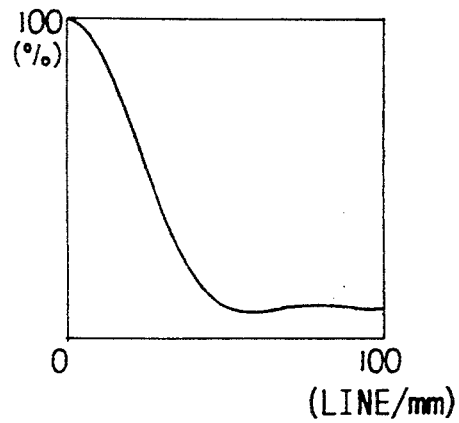
Figure 58D:
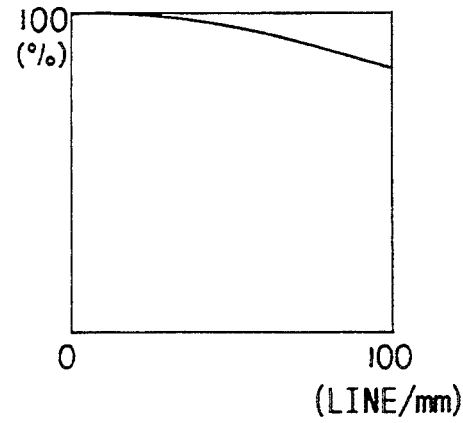

FIG. 54 shows, as an example of vari-focal lens systems, a lens system which has an entrance pupil at the most object side location (a lens system of a type which comprises an aperture stop on the object side). In FIG. 54, the reference numeral 24 represents the aperture stop, the reference symbol F designates the optical low pass filter, the reference numeral 19 denotes a fixed lens unit, the reference numeral 27 represents an optical low pass filter consisting of quartz plates, the reference numeral 20 designates a variator lens unit and the reference numeral 22 denotes a compensator lens unit. The image pickup apparatus illustrated in FIG. 54 comprises the quartz filters in addition to the members of the image pickup apparatus according to the present invention, and exhibits the effect to eliminate moiré which is obtained by combining the characteristic of the optical low pass filter F having the optical low pass effect with that of the quartz plates 27. When the optical means which controls an MTF as described above is to be combined, it is desirable to adopt a combination of an optical low pass filter having the MTF exemplified in FIG. 56 and quartz filters. In FIG. 56, the solid line a represents an MTF of the quartz filters, the chain line c designates the MTF of the optical low pass filter which is developed for the image pickup apparatus according to the present invention and the dashed line b represents an MTF which is obtained as a combination of the MTF's described above. As is seen from FIG. 56, the MTF of the quartz filters has a characteristic that it is free from influence due to defocusing and low at low frequencies. However, the quartz filters cannot eliminate the spurious signals sufficiently at high frequencies since the MTF thereof is enhanced again at the high frequencies. In contrast, the MTF having the cut-off frequency of the optical low pass filter F can be suppressed sufficiently low at the high frequencies, but its values are varied by defocusing especially at the high frequencies. Therefore, a favorable MTF characteristic can be obtained by combining the optical low pass filter with the quartz filters so as to cancel the defects of these filters with each other.

An MTF of the filter which is not made unstable by defocusing, scarcely degraded at the low frequencies, suppressed sufficiently low at the high frequencies and suited for eliminating moiré can be obtained by combining an optical low pass filter with quartz filters so as to satisfy the following condition:

$$\nu_c < \nu_m$$

wherein the reference symbols $\nu_c$ and $\nu_m$ represents cut-off frequencies of the quartz filters and the optical low pass filter developed for use in the image pickup apparatus respectively.

Description has been made above of the third type of image pickup apparatus according to the present invention which is configured for picking up images of an end surface of an image guide fiber bundle. For applying this third type of image pickup apparatus to an ordinary electronic camera or the similar instrument, it is sufficient to set $oA = o_{min}$ in the formula (xxiv).

Listed below is a numerical data which is adopted for the sixth embodiment of the image pickup apparatus according to the present invention illustrated in FIG. 41:

| | | | |
|---|---|---|---|
| $r_1 = \infty$ (stop) | | | |
| | $d_1 = 0.3000$ | | |
| $r_2 = \infty$ | | | |
| | $d_2 = 1.0000$ | $n_1 = 1.51633$ | $\nu_1 = 64.15$ |
| $r_3 = \infty$ | | | |
| | $d_3 = 2.5000$ | | |
| $r_4 = \infty$ | | | |
| | $d_4 = 1.0000$ | $n_2 = 1.51633$ | $\nu_2 = 64.15$ |
| $r_5 = \infty$ | | | |
| | $d_5 = 4.5000$ | | |
| $r_6 = \infty$ (aspherical surface) | | | |
| | $d_6 = 1.0000$ | $n_3 = 1.51633$ | $\nu_3 = 64.15$ |
| $r_7 = \infty$ | | | |
| | $d_7 = D_1$ (variable) | | |
| $r_8 = 9.0310$ | | | |
| | $d_8 = 3.0700$ | $n_4 = 1.51633$ | $\nu_4 = 64.15$ |
| $r_9 = 25.3350$ | | | |
| | $d_9 = D_2$ (variable) | | |
| $r_{10} = \infty$ | | | |
| | $d_{10} = 2.7000$ | $n_5 = 1.54869$ | $\nu_5 = 45.55$ |
| $r_{11} = \infty$ | | | |
| | $d_{11} = 2.3300$ | $n_6 = 1.54869$ | $\nu_6 = 45.55$ |
| $r_{12} = \infty$ | | | |
| | $d_{12} = 2.4300$ | $n_7 = 1.54869$ | $\nu_7 = 45.55$ |
| $r_{13} = \infty$ | | | |
| | $d_{13} = 1.2000$ | | |
| $r_{14} = -8.6190$ | | | |
| | $d_{14} = 0.8000$ | $n_8 = 1.88300$ | $\nu_8 = 40.78$ |
| $r_{15} = 16.9840$ | | | |
| | $d_{15} = D_3$ (variable) | | |
| $r_{16} = \infty$ | | | |
| | $d_{16} = 3.0000$ | $n_9 = 1.69680$ | $\nu_9 = 55.52$ |
| $r_{17} = -10.1010$ | | | |
| | $d_{17} = 0.2000$ | | |
| $r_{18} = 30.5000$ | | | |
| | $d_{18} = 2.5000$ | $n_{10} = 1.51633$ | $\nu_{10} = 64.15$ |
| $r_{19} = -267.8860$ | | | |
| | $d_{19} = 0.2000$ | | |
| $r_{20} = 9.8350$ | | | |
| | $d_{20} = 4.0000$ | $n_{11} = 1.69680$ | $\nu_{11} = 55.52$ |
| $r_{21} = \infty$ | | | |
| | $d_{21} = 0.9700$ | $n_{12} = 1.84666$ | $\nu_{12} = 23.78$ |
| $r_{22} = 17.4010$ | | | |
| | $d_{22} = 3.5000$ | | |
| $r_{23} = \infty$ | | | |
| | $d_{23} = 2.4300$ | $n_{13} = 1.54869$ | $\nu_{13} = 45.55$ |
| $r_{24} = \infty$ | | | |
| | $d_{24} = 2.3000$ | $n_{14} = 1.54869$ | $\nu_{14} = 45.55$ |
| $r_{25} = \infty$ | | | |
| | $d_{25} = 2.2300$ | | |
| $r_{26} = \infty$ | | | |
| | $d_{26} = 0.7900$ | $n_{15} = 1.51633$ | $\nu_{15} = 64.15$ |
| $r_{27} = \infty$ | | | |
| | $d_{27} = 1.2000$ | | |
| $r_{28} = \infty$ | | | |

| aspherical surface coefficients | |
|---|---|
| P = 1, B = 0, | E = $-0.24250 \times 10^{-2}$, |
| F = $0.28949 \times 10^{-2}$, | G = $-0.13801 \times 10^{-2}$, |
| H = $0.33659 \times 10^{-3}$, | I = $-0.44436 \times 10^{-4}$, |
| J = $0.30188 \times 10^{-5}$, | K = $-0.82612 \times 10^{-7}$ |

| | W | T |
|---|---|---|
| $D_1$ | 2.540 | 2.540 |
| $D_2$ | 1.000 | 3.540 |
| $D_3$ | 3.340 | 0.800 |

An aspherical surface used in the sixth embodiment of the present invention has a shape which is expressed as follows:

$$x = \frac{Cy^2}{1 + \sqrt{1 - PC^2y^2}} + By^2 + Ey^4 + Fy^6 + Gy^8 + Hy^{10} + Iy^{12} + Jy^{14} + Ky^{16} + \ldots$$

wherein the optical axis is taken as the x axis, a direction toward images is taken as positive, an intersection between the aspherical surface and the optical axis is taken as an origin, a direction perpendicular to the optical axis is taken as the y axis, the reference symbols x and y represent coordinates values, the reference symbol C designates an inverse number of a radius of curvature of a circle which is in contact with the aspherical surface in the vicinity of the optical axis, the reference symbol P denotes a parameter representing a shape of the aspherical surface, and the reference symbols B, E, F, G , ... represent the aspherical surface coefficients of the second, fourth, sixth, eighth , ... orders respectively. When all of B, E, F, G , ... are zero respectively at P=1, the formula shown above expresses a spherical surface.

In the sixth embodiment, the optical low pass filter has a form which produces the optical low pass effect in one direction only, for example, the horizontal scanning direction on CCD's and is similar to that the so-called cylindrical lens element.

Illustrated in FIG. 42A and FIG. 42B are axial aberrations, longitudinal and lateral in both the drawings, on a sectional surface taken along the horizontal scanning direction on the CCD's at a wide position and a tele position of the embodiment 6. Further, $o_{min}$ and $oA$ have values of 0.025 and 0.02 respectively at the wide position, whereas 0.05 and 0.03 respectively at the tele position.

Figure 57:
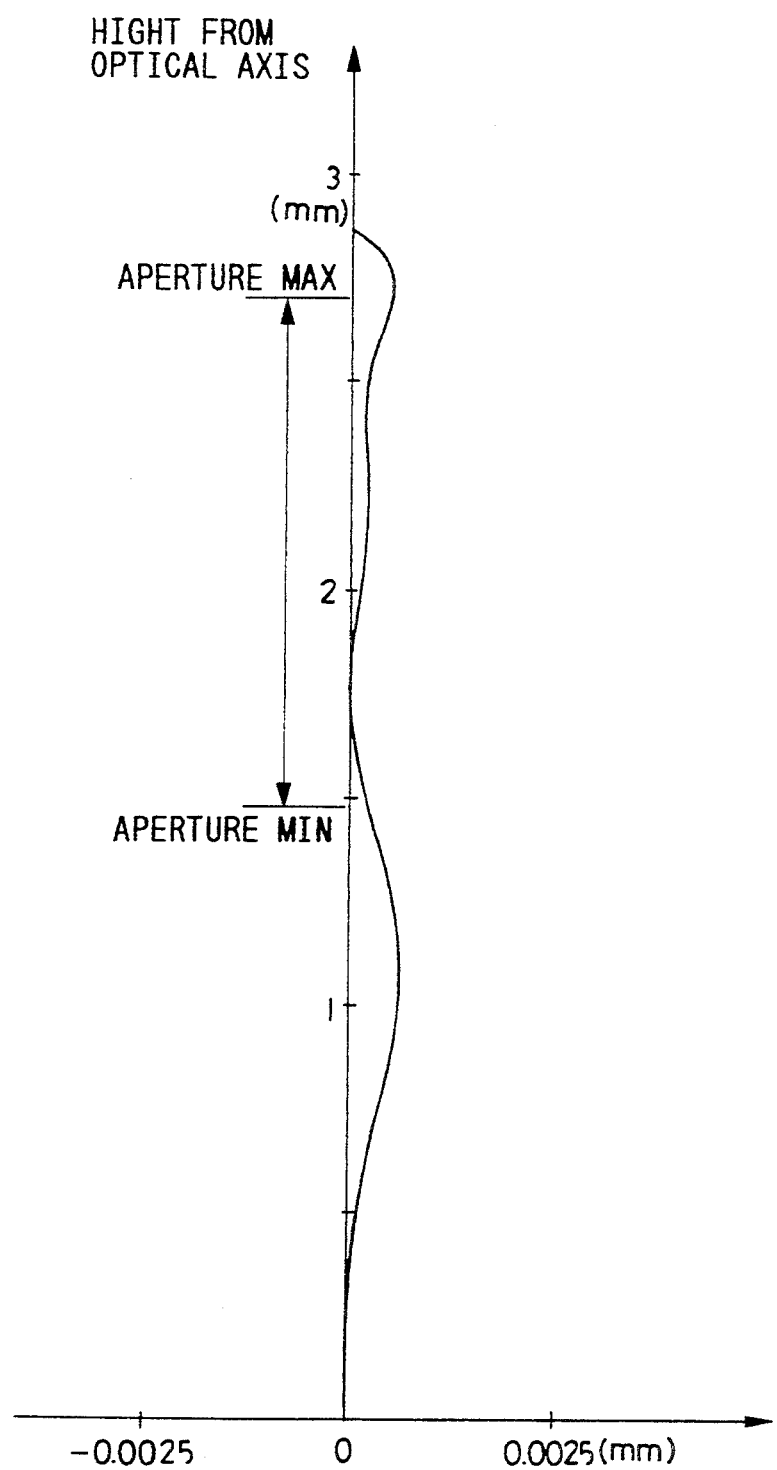
FIG. 57 shows a graph illustrating departure, as measured from a standard surface, of an aspherical surface which is to be used in the sixth embodiment of the image pickup apparatus according to the present invention.
Figure 59A:
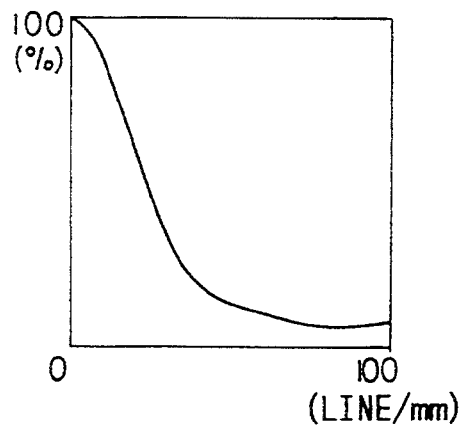
FIG. 59A, FIG. 59B, FIG. 59C and FIG. 59D show graphs illustrating MTF's at the tele position of the sixth embodiment of the image pickup apparatus according to the present invention.
Figure 59B:
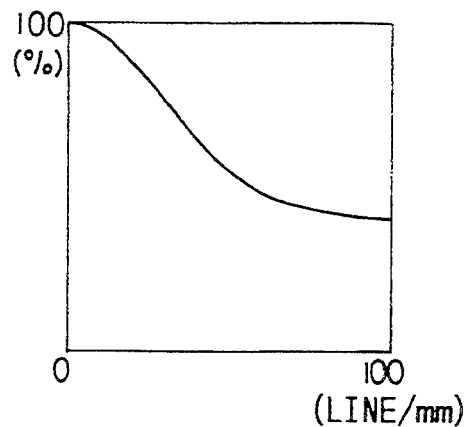
Figure 59C:
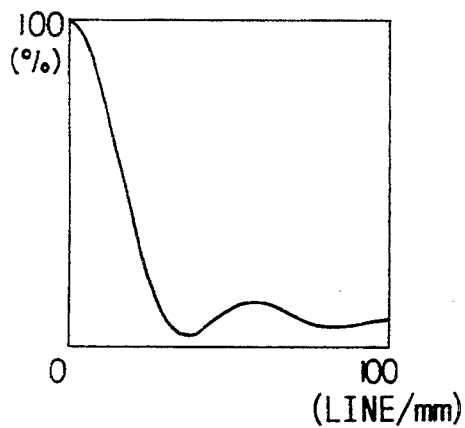
Figure 59D:
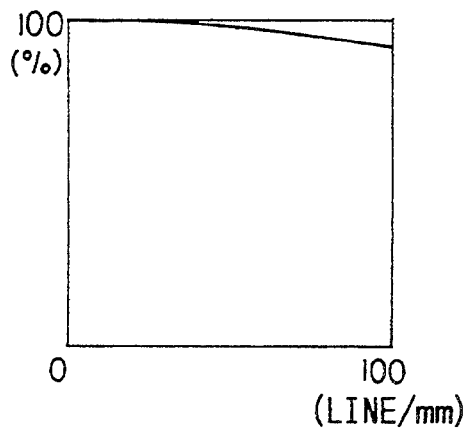

Visualized in FIG. 43A and FIG. 43B are axial aberrations at the wide position and tele position of the sixth embodiment in a direction perpendicular to the horizontal scanning direction on the image pickup devices. A refracting surface having the optical low pass effect which is adopted for the sixth embodiment has, in the horizontal scanning direction on the solid-state image pickup devices, a sectional shape illustrated in FIG. 57 which is represented as departure from a standard surface (departure from the reference sphere of the refracting surface). In the direction perpendicular to the horizontal scanning direction, the refracting surface has a planar section.

FIG. 58A, FIG. 58B, FIG. 58C and FIG. 58D show curves illustrating MTF's at the wide position of the fifth embodiment, whereas FIG. 59A, FIG. 59B, FIG. 59C and FIG. 59D shows graphs illustrating MTF's at the tele position of the sixth embodiment. As is apparent from these drawings, the MTF's are enhanced in the vertical direction by reducing the diameter of the aperture stop, whereas the MTF's are lowered in the horizontal direction by reducing the diameter of the aperture stop. It will therefore be understood that the third type of the imaging optical system is suited for the image pickup apparatus according to the present invention.

Figure 60A:
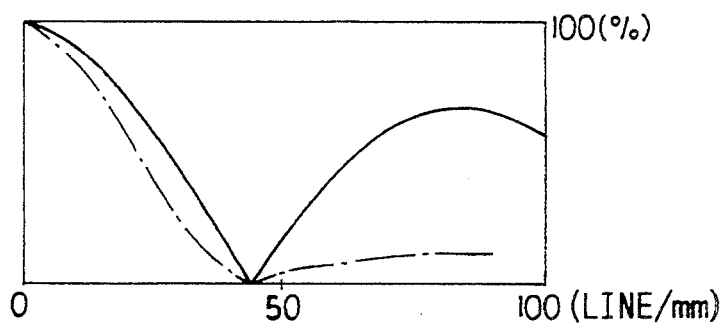
FIG. 60A and FIG. 60B show graphs illustrating MTF's of the sixth embodiment of the present invention when it comprises quartz plates.
Figure 60B:
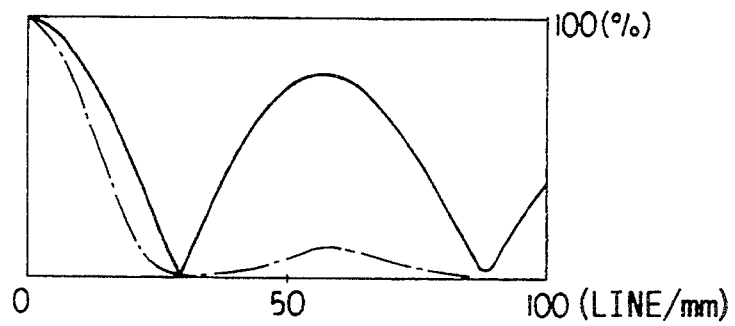

In the sixth embodiment, a quartz filter is disposed before the variator. The direction in which images are separated by the quartz filter is made coincident with the horizontal scanning direction on the CCD's. Assuming that the quartz filter is 2.587 mm thick, a rear lens unit used in the fifth embodiment has a magnification of 0.613× at the wide position and a magnification of 1.1309× at the tele position for separating the spot images by the quartz filter. The MTF of the imaging optical system which is lowered due to diffraction is as represented by the solid line in FIG. 60A at the wide position and in FIG. 60B at the tele position. Additions of the MTF's traced in the solid lines and MTF's influenced due to spherical aberration produced at the maximum aperture are represented as the curves traced in the chain lines in FIG. 60A and FIG. 60B. These drawings clarify the merit of the quartz filter and that of the aberration which is produced only in the horizontal scanning direction on the CCD's by the third type of optical low pass filter. It is therefore possible to correct the defect of the quartz plate or prevent enhancement of an MTF at the high frequencies by properly determining a cut-off frequency for the third type a optical low pass filter. Though the quartz filter is disposed before the variator in the sixth embodiment, it is allowed to dispose a low pass filter such as a quartz filter immediately before the CCD's.

Further, it is possible to make a plurality of lens elements of birefringent substances such as quartz and impart the function of the optical low pass filter to one of these lens elements in the imaging optical system though the optical low pass filters made of materials such as the birefringent substance are disposed separately from the lens elements in the sixth embodiment. The object of the present invention can be accomplished by selecting positional relationship between the lens elements made of the birefringent substance and the variator so as to be similar to that between the optical low pass filters and the variator in the sixth embodiment.

Figure 41A:
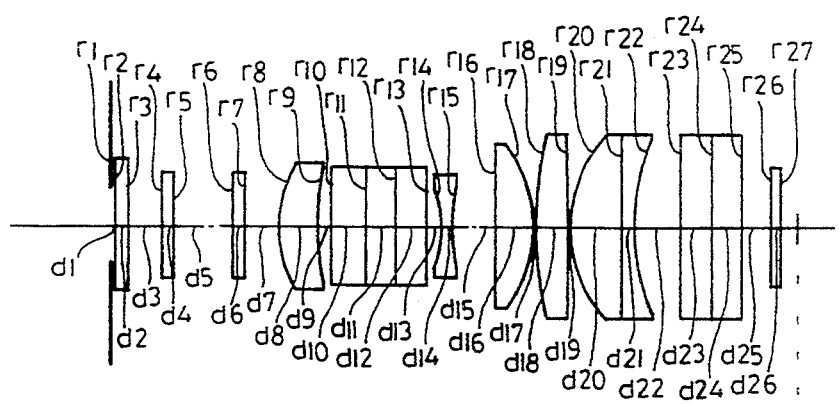
FIGS. 41A and 41B show a sectional view illustrating an imaging optical system which is to be used in a sixth embodiment of a third type of image pickup apparatus according to the present invention.
Figure 41B:
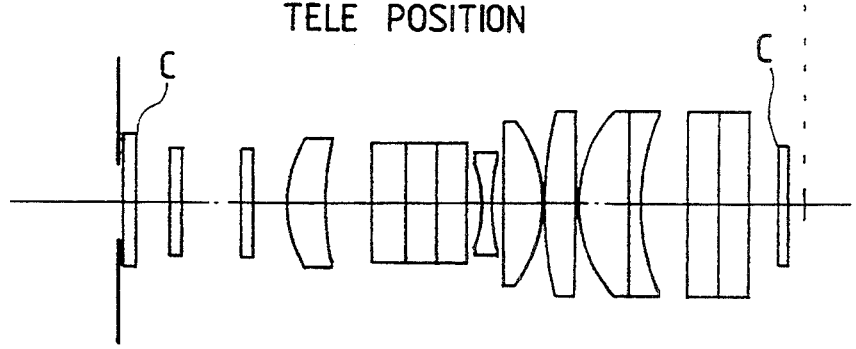
Figure 50A:
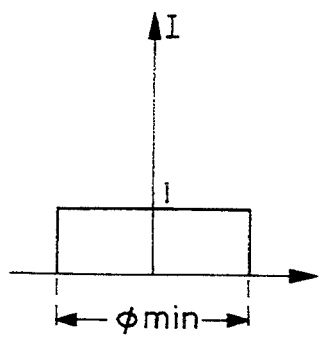
FIG. 50A and FIG. 50B show diagrams illustrating two components obtained by dividing the relationship shown in FIG. 49.
Figure 50B:
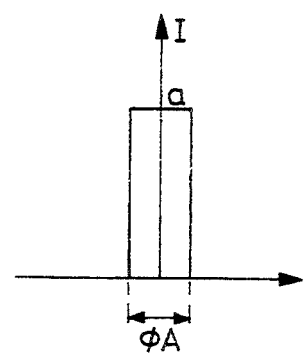

An aspherical surface which is to be used as the third type of refracting surface may be disposed on the cover glass plate C or one of the lens elements shown in FIG. 41. Alternately, a plurality of aspherical surface may be used in the imaging optical system.

Figure 61A:
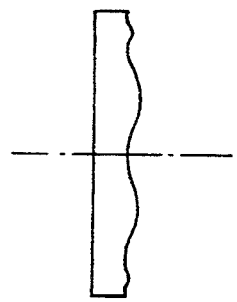
FIG. 61A, FIG. 61B and FIG. 62 show diagrams illustrating other examples of the third type of the optical low pass filter.
Figure 61B:
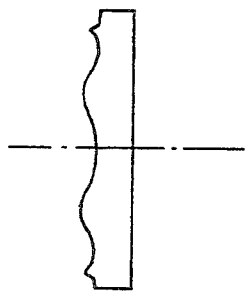
Figure 62:
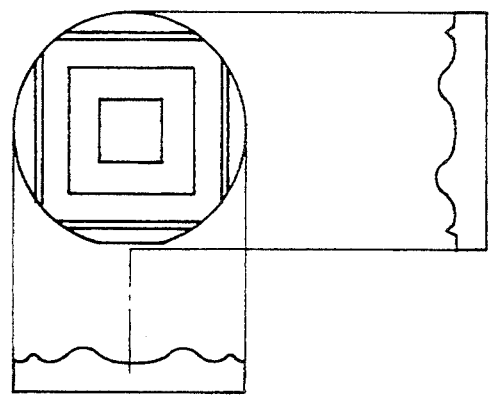

A surface which has the third type of optical low pass effect and the sectional shape in the x direction as shown in FIG. 61A, and another surface which has the third type of optical low pass effect and the sectional shape in the direction perpendicular to the x direction as shown in FIG. 61B can be disposed on both sides of a single plate. Further, a single refracting surface may be configured so as to have different sectional shapes in two or more directions.

Figure 63:
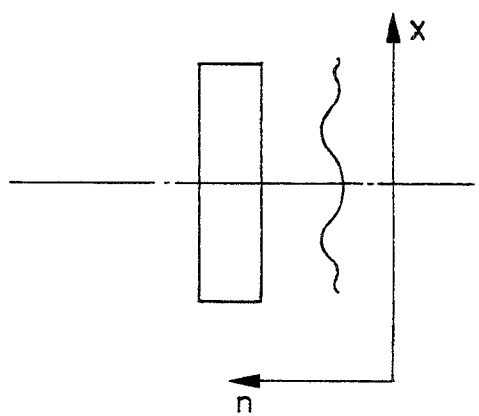
FIG. 63 shows a sectional view illustrating still another example of the third type of an optical low pass filter which is made of an nonhomogenous medium.

It is possible to use a graded refractive index lens element having a refractive index distribution as shown in FIG. 63 in place of the third type of refracting surface having the optical low pass effect.

We claim:

1. An electronic image pickup apparatus comprising:
   an imaging optical system for forming images of an object; and
   an image pickup device having a light receiving surface which samples said images at discontinuously distributed points, said image pickup device outputting signals representing light intensity distributions of said images;
   said imaging optical system comprising a refracting surface having an optical low pass effect, said refracting surface having an inner portion which is nearly conical in a first direction and having an outer portion which is nearly conical in a second direction opposite to said first direction.

2. An electronic image pickup apparatus comprising:
   an imaging optical system comprising an aperture stop, said imaging optical system forming images of objects;
   an image pickup device having a light receiving surface which samples said images at discontinuously distributed points; and
   at least one aspherical surface which has an optical low pass effect and which is disposed in a vicinity of said aperture stop comprised in said imaging optical system;
   said image pickup apparatus satisfying the following condition:

$$(E) \quad S/2 \leq f_R \sin\{|\theta_m||n_1-n_0|/m_0\} \leq 3S$$

wherein said reference symbol S represents a minimum value of sampling intervals of said image pickup device, said reference symbol $\theta_m$ designates a maximum absolute value of a component, as measured in a sampling direction, of a difference between an inclination angle of a normal to said aspherical surface and an inclination angle of a normal to a reference sphere of said aspherical surface, said reference symbols $n_0$ and $n_1$ denote refractive indices of media located on both sides of said aspherical surface having said optical low pass effect, and said reference symbol $f_R$ represents a focal length of an optical system disposed on an image side of said aperture stop.

3. An electronic image pickup apparatus comprising:
   an image pickup device having a light receiving surface for sampling light intensities of images of an object;
   an imaging optical system for forming said images of said object on said light receiving surface of said image pickup apparatus;
   an aperture stop; and optical means, disposed in a vicinity of said aperture stop, for lowering a frequency response of said images by producing aberrations of high orders having directivities on said images formed by said imaging optical system, said optical means comprising an aspherical surface which is expressed by the formula $z=f(x) \cdot g(y)$ and said aberrations of high orders are produced by refraction of a light on said aspherical surface, said reference symbol z being a coordinate axis in a direction of an optical axis, and said reference symbols x and y are coordinate axes in directions perpendicular to said optical axis, said reference symbol f(x) being a function of said reference symbol x as a first variable, and said reference symbol g(y) being a function of said reference symbol y as a second variable.

4. An electronic image pickup apparatus according to claim 3, wherein:

said aperture stop is included in said imaging optical system;

said image pickup device samples said images at discontinuously distributed points;

said aspherical surface having an optical low pass effect is disposed in a vicinity of said aperture stop; and said image pickup devices satisfies the following conditions (E):

(E) $S/2 \leq f_R \sin\{|\theta_m| |n_1-n_0|/n_0\} \leq 3S \quad |\theta_m| \leq 90°$ wherein said reference symbol S represents a minimum sampling interval in said image pickup device for obtaining said light intensities, said reference symbol $|\theta_m|$ is an absolute maximum value of a component in a sampling direction of a difference between an inclination angle of a normal to said aspherical surface having said optical low pass effect and an inclination angle of a normal to a standard surface of said aspherical surface, said reference symbols $n_0$ and $n_1$ denote refractive indices of media which are located on an object side and an image side respectively of said aspherical surface having said optical low pass effect, and said reference symbol $f_R$ represents a focal length of an optical system which is disposed on an image side from said aperture stop.

* * * * *